US008829078B2

(12) United States Patent
Kyota

(10) Patent No.: US 8,829,078 B2
(45) Date of Patent: Sep. 9, 2014

(54) INK COMPOSITION FOR INKJET RECORDING, INKJET RECORDING METHOD AND INKJET PRINTED ARTICLE

(75) Inventor: Hirokazu Kyota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 263 days.

(21) Appl. No.: 13/194,071

(22) Filed: Jul. 29, 2011

(65) Prior Publication Data
US 2012/0052257 A1 Mar. 1, 2012

(30) Foreign Application Priority Data

Aug. 27, 2010 (JP) ................................. 2010-191472
Sep. 27, 2010 (JP) ................................. 2010-215742

(51) Int. Cl.
C09D 11/00 (2014.01)
C08G 18/28 (2006.01)
G01D 11/00 (2006.01)
C09D 4/00 (2006.01)

(52) U.S. Cl.
CPC ....................................... C09D 4/00 (2013.01)
USPC ............................. 523/160; 524/590; 347/100

(58) Field of Classification Search
USPC .................... 523/160; 524/589, 590; 347/100
See application file for complete search history.

(56) References Cited

U.S. PATENT DOCUMENTS

| | | | |
|---|---|---|---|
| 4,155,767 A | 5/1979 | Specht et al. | |
| 4,212,642 A * | 7/1980 | Della Casa et al. | 8/470 |
| 6,315,926 B1 * | 11/2001 | Jansen | 252/500 |
| 6,918,955 B2 * | 7/2005 | Yokoyama et al. | 106/31.28 |
| 2004/0127596 A1 * | 7/2004 | Biro et al. | 522/167 |
| 2009/0000508 A1 | 1/2009 | Edison et al. | |
| 2009/0087627 A1 * | 4/2009 | Watanabe et al. | 428/195.1 |

FOREIGN PATENT DOCUMENTS

| | | |
|---|---|---|
| EP | 0 422 500 A2 | 4/1991 |
| JP | 11-124404 A | 5/1999 |
| JP | 2000-335085 A | 12/2000 |
| JP | 2003-212937 A | 7/2003 |
| JP | 2004-091555 A | 3/2004 |
| JP | 2004-285304 A | 10/2004 |
| JP | 2008-507598 A | 3/2008 |
| JP | 2009-108171 A | 5/2009 |

OTHER PUBLICATIONS

Communication, dated Apr. 12, 2012, issued in corresponding EP Application No. 11175213.5, 10 pages.
Gaina et al., "Thermal and Mechanical Characterization of Maleimide-Functionalized Copoly(urethane-urea)s," Journal of Applied Polymer Science, vol. 113, No. 5, Sep. 5, 2009, pp. 3245-3254.
Communication Pursuant to Article 94(3) EPC, dated Mar. 28, 2013, issue in corresponding EP Application No. 11 175 213.5, 5 pages.
Perelaer et al., "The Spreading of Inkjet-Printed Droplets with Varying Polymer Molar Mass on a Dry Solid Substrate," Macromolecular Chemistry and Physics, vol. 210, No. 6, Mar. 25, 2009, pp. 495-502.
Communication pursuant to Article 94(3) EPC, dated Jul. 23, 2013, issued in corresponding EP Application No. 11175213.5, 5 pages in English.
Office Action dated Mar. 18, 2014 in Japanese Application No. 2010-191472.
Office Action dated Feb. 26, 2014 in European Application No. 11 175 213.5.

* cited by examiner

Primary Examiner — Alexander Kollias
(74) Attorney, Agent, or Firm — Sughrue Mion, PLLC

(57) ABSTRACT

An ink composition for inkjet recording including: a urethane oligomer or polymer that has at least one group selected from the group consisting of groups represented by following Formulae (1) to (3) at one or more side chains of the oligomer or polymer; and an organic solvent.

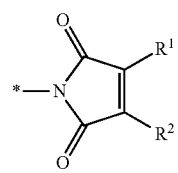

Formula (1)

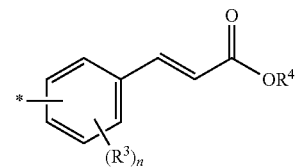

Formula (2)

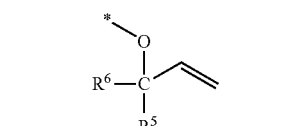

Formula (3)

24 Claims, No Drawings

INK COMPOSITION FOR INKJET RECORDING, INKJET RECORDING METHOD AND INKJET PRINTED ARTICLE

CROSS-REFERENCE TO RELATED APPLICATIONS

This application is based on and claims priority under 35 USC 119 from Japanese Patent Application No. 2010-191472 filed on Aug. 27, 2010, and Japanese Patent Application No. 2010-215742 filed on Sep. 27, 2010, the disclosures of which are incorporated by reference herein.

BACKGROUND

1. Technical Field

The present invention relates to an ink composition for inkjet recording, an inkjet recording method and an inkjet printed article.

2. Related Art

Image recording methods for forming an image on recording media, such as paper, based on image data signals include electrophotographic methods, sublimation transfer methods, melt transfer methods, and inkjet methods. From among these methods, inkjet methods have low running cost since inkjet methods can be carried out using inexpensive apparatuses, and ink usage efficiently is high due to direct image formation on a recording medium by ejection of ink to only the required image regions.

Inkjet methods are capable of printing on recording media that are not water-absorbent, such as plastic sheets and metal plates, as well as on plain paper. However, an increase in printing speed and improvement of print image quality are major challenge to inkjet methods. Inkjet methods have properties such that the time required for drying and curing liquid droplets after printing substantially affects the productivity of printed articles and the sharpness of print image.

An example of inkjet methods is a recording method in which an ink for inkjet recording that is capable of being cured by irradiation with a radiation is used. In this method, irradiation with a radiation is carried out directly after ink ejection or when a certain period has passed after ink ejection, thereby curing ink droplets, whereby print productivity is increased, and a sharp image can be formed.

Japanese Patent Application Laid-open (JP-A) No. 2008-507598 proposes a non-aqueous active energy radiation-curable ink that contains a curable ethylenic unsaturated oligomer, a photopolymerization initiator, and a pigment dispersion liquid with a view to improving the ejection properties of the ink and the viscosity of the ink.

JP-A No. 2004-285304 proposes an active energy radiation-curable ink in which an aqueous polyurethane resin having an active energy radiation-curable unsaturated double bond is used with a view to improving, for example, water fastness.

JP-A No. 2009-108171 proposes a photo-curable ink composition that contains a urethane-type oligomer compound with a view to improving curability.

SUMMARY

According to an aspect of the present invention, there is provided an ink composition for inkjet recording, including:

(Component A) a urethane oligomer or polymer that has at least one group selected from the group consisting of groups represented by following Formulae (1) to (3) at one or more side chains of the oligomer or polymer; and (Component B) an organic solvent,

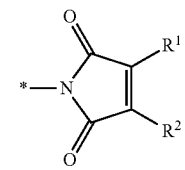
Formula (1)

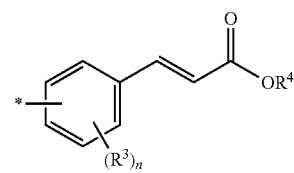
Formula (2)

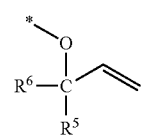
Formula (3)

wherein, in Formula (1), $R^1$ and $R^2$ each independently represent a hydrogen atom or an alkyl group, and $R^1$ and $R^2$ may be bonded to each other to form a ring; and wherein, in Formula (2), each $R^3$ independently represents a hydrogen atom, an alkyl group, an alkoxy group, an aryloxy group, an alkoxycarbonyl group, an aryloxycarbonyl group or a halogen atom; $R^3$s may be bonded to each other to form a ring; $R^4$ represents a hydrogen atom, an alkyl group or an aryl group; and n represents an integer from 0 to 4; and wherein, in Formula (3), $R^5$ and $R^6$ each independently represent a hydrogen atom, an alkyl group or an aryl group, and $R^5$ and $R^6$ may be bonded to each other to form a ring; and wherein, in Formulae (1) to (3), * represents a bonding position.

DETAILED DESCRIPTION

First Embodiment

A first embodiment of the present invention is described below. In the description of the first embodiment below, expressions such as "of the invention", "according to the invention" or "in the invention" refers to "of the first embodiment of the invention", "according to the first embodiment of the invention" and "in the first embodiment of the invention", respectively, unless otherwise indicated.

[Ink Composition for Inkjet Recording]

The ink composition for inkjet recording according to the invention includes:

(Component A) a urethane oligomer or polymer that has at least one group selected from the group consisting of groups represented by following Formulae (1) to (3) at one or more side chains of the oligomer or polymer; and (Component B) an organic solvent,

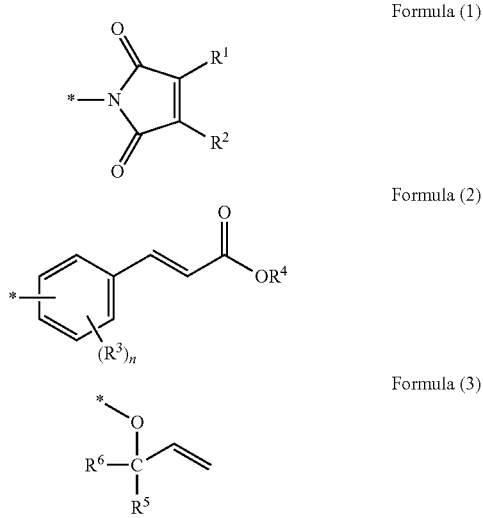

Formula (1)

Formula (2)

Formula (3)

In Formula (1), $R^1$ and $R^2$ each independently represent a hydrogen atom or an alkyl group, and $R^1$ and $R^2$ may be bonded to each other to form a ring. In Formula (2), each $R^3$ independently represents a hydrogen atom, an alkyl group, an alkoxy group, an aryloxy group, an alkoxycarbonyl group, an aryloxycarbonyl group or a halogen atom; $R^3$s may be bonded to each other to form a ring; $R^4$ represents a hydrogen atom, an alkyl group or an aryl group; and n represents an integer from 0 to 4. In Formula (3), $R^5$ and $R^6$ each independently represent a hydrogen atom, an alkyl group or an aryl group, and $R^5$ and $R^6$ may be bonded to each other to form a ring. In Formulae (1) to (3), * represents a bonding position.

The "urethane oligomer or polymer" in the invention refers to a compound that includes two or more urethane structural units represented by [—CONH—R—NHCOO—R'—O—], wherein R represents a divalent group that forms an isocyanate skeleton, and R' represents a divalent group that forms an alcohol component. In other words, the urethane structural units may be formed by a reaction of a divalent isocyanate compound represented by OCN—R—NCO or a higher-valent isocyanate compound with a divalent alcohol represented by HO—R'—OH or a polyhydric alcohol compound. The "urethane oligomer" or "urethane polymer" in the invention refers to a so-called urethane oligomer or a so-called urethane polymer (polyurethane). Hereinafter, the urethane oligomer and the urethane polymer are collectively referred to as simply a "urethane compound" or "urethane compounds".

The urethane compound according to the invention has a weight average molecular weight of preferably from 1,000 to 20,000, more preferably from 1,000 to 15,000, and most preferably from 2,000 to 10,000.

Weight average molecular weight is measured with a gel permeation chromatograph (GPC). HLC-8220GPC manufactured by Tosoh Corporation, is used as a GPC. Three columns, TSKgel Super HZM-H, TSKgel SuperHZ4000 and TSKgel SuperHZ2000 (all of which are manufactured by Tosoh Corporation, 4.6 mmID (inner diameter)×15 cm), are used for measurement. THF (tetrahydrofuran) is used as an eluent. Regarding the conditions, the sample concentration is 0.35% by mass, the flow rate is 0.35 ml/min, the sample injection amount is 10 μA, and the measurement temperature is 40° C. Detection is performed using an RI (refractive index) detector. A calibration curve is prepared from the following eight samples: standard sample TSK STANDARD POLYSTYRENE, F-40, F-20, F-4, F-1, A-5000, A-2500, A-1000, and n-propylbenzene, all of which are manufactured by Tosoh Corporation.

The "oligomer" as used in relation to the "urethane oligomer" according to the invention refers to a polymeric compound having a weight average molecular weight of from 1,000 to 10,000, and the "polymer" as used in relation to the "urethane polymer" or "polyurethane" refers to a polymeric compound having a molecular weight of, for example, 10,000 or more, and preferably having a molecular weight of from 10,000 to 20,000.

The urethane compound according to the invention is preferably an urethane oligomer.

Hereinafter, the ink composition for inkjet recording according to the invention is sometimes referred to as "ink composition". The expression "from X to Y" as used herein means a range including the values X and Y as the lower limit value and the upper limit value.

((Component A) Urethane Oligomer or Polymer)

The urethane oligomer or polymer used in the invention has, at one or more side chains thereof, at least one type of group selected from the group consisting of groups represented by following Formulae (1) to (3). In other words, the urethane oligomer or polymer used in the invention has at least one of (i) a group represented by following Formula (1), (ii) a group represented by following Formula (2), or (iii) a group represented by following Formula (3), at one or more side chains of the urethane oligomer or polymer. When the urethane oligomer or polymer has two or more of the groups (i) to (iii), each group may be present in the same side chain or respectively different side chains. Use of the urethane compound according to the invention promotes a crosslinking reaction of the ink composition. The urethane compound according to the invention preferably undergoes a crosslinking reaction by being irradiated with an active energy radiation such as an ultraviolet rays (hereinafter also referred to as "UV light"), visible light or electron beams. The Component A preferably undergoes a crosslinking reaction through a [2+2] cycloaddition reaction even when an initiator is not used.

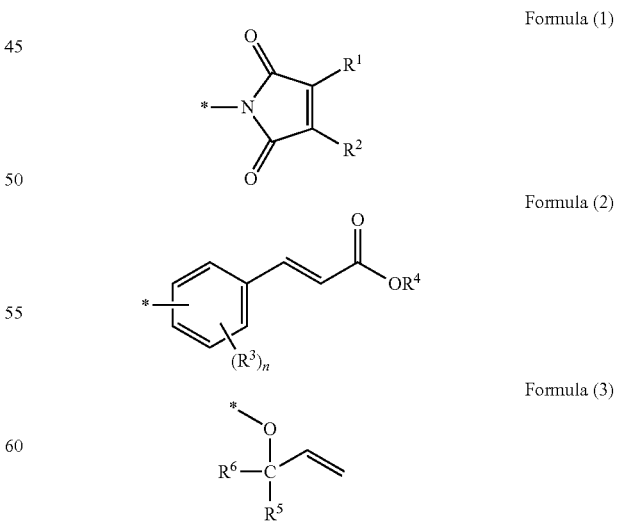

Formula (1)

Formula (2)

Formula (3)

In Formula (1), $R^1$ and $R^2$ each independently represent a hydrogen atom or an alkyl group, and $R^1$ and $R^2$ may be bonded to each other to form a ring.

In Formula (2), each $R^3$ independently represents a hydrogen atom, an alkyl group, an alkoxy group, an aryloxy group, an alkoxycarbonyl group, an aryloxycarbonyl group or a halogen atom, $R^3$s may be bonded to each other to form a ring, $R^4$ represents a hydrogen atom, an alkyl group or an aryl group, and n represents an integer of from 0 to 4.

In Formula (3), $R^5$ and $R^6$ each independently represent a hydrogen atom, an alkyl group or an aryl group, and $R^5$ and $R^6$ may be bonded to each other to form a ring. In Formulae (1) to (3), * represents a bonding position.

The urethane compound according to the invention may be used singly, or in combination of two or more thereof.

The urethane compound according to the invention may be substituted by two or more types of group selected from the groups represented by Formulae (1) to (3), in combination. Nevertheless, it is preferable that the urethene compound according to the invention is substituted by one type of group selected from the groups represented by Formulae (1) to (3) at a side chain.

In the urethane compound according to the invention, a group selected from the groups represented by Formulae (1) to (3) may be attached to a urethane skeleton via a single bond or an alkylene group. The alkylene group is preferably an alkylene group having from 1 to 20 carbon atoms, more preferably from 1 to 16 carbon atoms, and still more preferably from 1 to 12 carbon atoms, although the alkylene group is not limited thereto. The alkylene group may have a linear structure or a branched structure. The alkylene group may include an ether bond or an ester bond that interrupts the alkylene chain.

The urethane compound used in the invention preferably includes at least one type of group selected from the group consisting of the groups represented by Formulae (1) to (3). However, groups that the urethane compound may have are not limited thereto. The groups of Formulae (1) to (3) are individually explained in detail below.

—Group Represented by Formula (1)—

$R^1$ and $R^2$ in Formula (1) each independently represent a hydrogen atom or an alkyl group, and $R^1$ and $R^2$ may be bonded to each other to form an aliphatic ring.

The alkyl group represented by $R^1$ or $R^2$ may be an alkyl group having from 1 to 4 carbon atoms, which may have a linear structure or a branched structure. However, the alkyl group is not limited thereto. Specifically, the alkyl group may be, for example, a methyl group, an ethyl group, a propyl group, an isopropyl group, a n-butyl group, an isobutyl group, a s-butyl group or a t-butyl group. $R^1$ and $R^2$ may be bonded to each other to form an aliphatic 4-membered ring, an aliphatic 5-membered ring or an aliphatic 6-membered ring. $R^1$ and $R^2$ each independently represent preferably an alkyl group having from 1 to 2 carbon atoms, and more preferably a methyl group. In a case in which $R^1$ and $R^2$ are bonded to each other to form a 4-, 5- or 6-membered ring, the ring is preferably a 5-membered ring or a 6-membered ring, and more preferably a 6-membered ring.

Each of $R^1$ and $R^2$ in Formula (1) is preferably a methyl group.

Examples of the group represented by the Formula (1) above include, but are not limited to, Exemplary Groups (1-1) to (1-4) shown below. The group (1-2) is preferable.

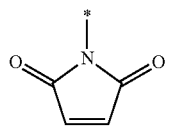

(1-1)

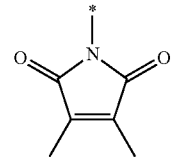

(1-2)

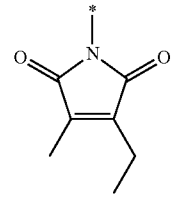

(1-3)

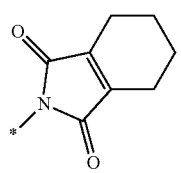

(1-4)

—Group Represented by Formula (2)—

Each $R^3$ in Formula (2) independently represents a hydrogen atom, an alkyl group, an alkoxy group, an aryloxy group, an alkoxycarbonyl group, an aryloxycarbonyl group or a halogen atom, and independently represents preferably a hydrogen atom or an alkoxy group. $R^3$s may be bonded to each other to form a ring. $R^4$ represents a hydrogen atom, an alkyl group or an aryl group, and preferably represents an alkyl group. Further, n represents an integer of from 0 to 4.

The alkyl group represented by $R^3$ in Formula (2) is not particularly limited, and the specifics thereof, including preferable ranges thereof, may be the same as the specifics, including preferable ranges, of the alkyl group represented by $R^1$ or $R^2$ in the Formula (1) above.

The alkoxy group represented by $R^3$ in Formula (2) may represent an alkoxy group having from 1 to 8 carbon atoms, which may have a linear structure or a branched structure. However, the alkoxy group is not limited thereto. Specific examples of the alkoxy group include a methoxy group, an ethoxy group, a propyloxy group, an isopropyloxy group and a butoxy group.

The aryloxy group represented by $R^3$ in Formula (2) may be an aryloxy group having from 6 to 20 carbon atoms. However, the aryloxy group is not limited thereto. Specific examples of the aryloxy group include a phenyloxy group and a naphthyloxy group.

The alkoxycarbonyl group represented by $R^3$ in Formula (2) may be an alkoxycarbonyl group having from 2 to 12 carbon atoms, which may have a linear structure or a branched structure. However, the alkoxycarbonyl group is not limited thereto. Specific examples of the alkoxycarbonyl group include a methoxycarbonyl group, an ethoxycarbonyl group and a butoxycarbonyl group.

The aryloxycarbonyl group represented by $R^3$ in Formula (2) may be an aryloxycarbonyl group having from 7 to 15 carbon atoms. However, the aryloxycarbonyl group is not limited thereto. Specific examples of the aryloxycarbonyl group include a phenyloxycarbonyl group and a naphthyloxycarbonyl group.

Examples of the halogen atom represented by $R^3$ in Formula (2) include, but are not limited to, a fluorine atom, a chlorine atom, a bromine atom and an iodine atom.

The alkyl group represented by $R^4$ in Formula (2) is not particularly limited, and the specifics thereof, including preferable ranges thereof, may be the same as the specifics, including preferable ranges, of the alkyl group represented by $R^1$ or $R^2$ in the Formula (1) above.

The aryl group represented by $R^4$ in Formula (2) may be an aryl group having from 6 to 20 carbon atoms, specific examples of which include a phenyl group and a naphthyl group. However, the aryl group is not limited thereto. The aryl group is preferably an aryl group having from 6 to 16 carbon atoms, and more preferably an aryl group having from 6 to 10 carbon atoms.

Examples of the group represented by Formula (2) include, but are not limited to, Exemplary Groups (2-1) to (2-3) shown below.

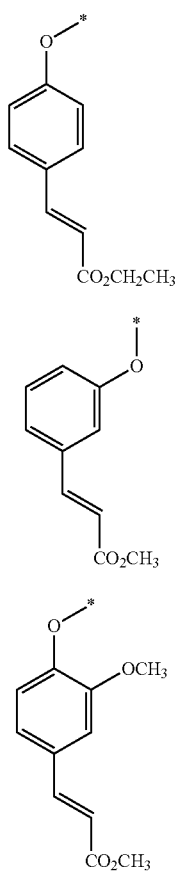

—Group Represented by Formula (3)—

$R^5$ and $R^6$ in Formula (3) each independently represent a hydrogen atom, an alkyl group or an aryl group, and each independently represent preferably a hydrogen atom or an alkyl group. $R^5$ and $R^6$ may be bonded to each other to form a ring. In a case in which $R^5$ and $R^6$ together form a ring, the ring is preferably an aliphatic ring.

The alkyl group represented by $R^5$ or $R^6$ in Formula (3) is not particularly limited, and the specifics thereof, including preferable ranges thereof, may be the same as the specifics, including preferable ranges, of the alkyl group represented by $R^1$ or $R^2$ in the Formula (1) above.

The aryl group represented by $R^5$ or $R^6$ in Formula (3) is not particularly limited, and the specifics thereof, including preferable ranges thereof, are the same as the specifics, including preferable ranges, of the aryl group represented by $R^4$ in the Formula (2) above.

Examples of the structure represented by the Formula (3) above include, but are not limited to, Exemplary Groups (3-1) and (3-2) shown below.

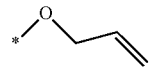

(3-1)

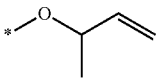

(3-2)

The urethane compound according to the invention is particularly preferably a urethane compound having a structure represented by Formula (1) at a side chain.

The urethane compound according to the invention may include at least one type of group selected from the group consisting of the groups represented by Formulae (1) to (3) in an isocyanate component or an alcohol component or both. It is preferable that the urethane compound according to the invention includes at least one type of repeating unit selected from the group consisting of the repeating units represented by following Formulae (11) to (13), which is hereinafter referred to as "alcohol component (c)".

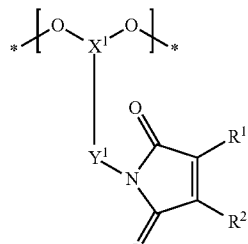

(Formula (11))

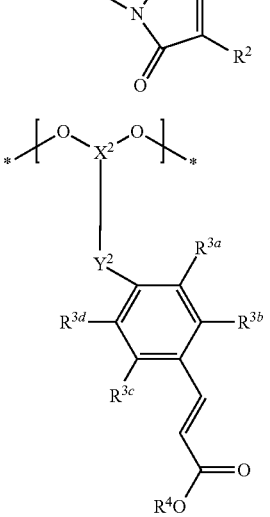

(Formula (12))

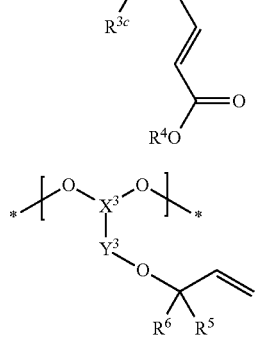

Formula (13)

In Formula (11), $R^1$ and $R^2$ each independently represent a hydrogen atom or an alkyl group, and $R^1$ and $R^2$ may be bonded to each other to form a ring. In Formula (12), $R^{3a}$, $R^{3b}$, $R^{3c}$ and $R^{3d}$ each independently represent a hydrogen atom, an alkyl group, an alkoxy group, an aryloxy group, an alkoxycarbonyl group, an aryloxycarbonyl group or a halogen atom, and $R^{3a}$, $R^{3b}$, $R^{3c}$ or $R^{3d}$ may be bonded to another of $R^{3a}$, $R^{3b}$, $R^{3c}$ or $R^{3d}$ to form a ring. $R^4$ represents a hydrogen atom, an alkyl group or an aryl group. In Formula (13), $R^5$ and $R^6$ each independently represent a hydrogen atom, an alkyl group or an aryl group, and $R^5$ and $R^6$ may be bonded to each other to form a ring. In Formulae (11) to (13), $X^1$ to $X^3$ each independently represent a residue obtained by removing three hydrogen atoms from at least one compound selected from the group consisting of an alkane having from 3 to 10 carbon atoms and a cycloalkane having from 3 to 10 carbon atoms. $Y^1$ to $Y^3$ each independently represent a single bond or an alkylene group.

The specifics, including preferable ranges, of $R^1$, $R^2$, $R^4$, $R^5$ and $R^6$ in Formulae (11), (12) and (13) are the same as the specifics, including preferable ranges, of $R^1$, $R^2$, $R^4$, $R^5$ and $R^6$, respectively, in the Formulae (1), (2) and (3) above. The specifics, including preferable ranges, of $R^{3a}$, $R^{3b}$, $R^{3c}$ and $R^{3d}$ in Formula (12) are the same as the specifics, including preferable ranges, of $R^3$ in Formula (3).

$Y^1$ to $Y^3$ in Formulae (11) to (13) each independently represent a single bond or an alkylene group.

The alkylene group represented by any of $Y^1$ to $Y^3$ is not limited, and is preferably an alkylene group having from 1 to 20 carbon atoms, more preferably an alkylene group having from 1 to 16 carbon atoms, and still more preferably an alkyl group having from 1 to 12 carbon atoms. The alkylene group may have a linear structure or a branched structure.

The alkylene group represented by any of $Y^1$ to $Y^3$ may or may not have a substituent, and it is preferable that the alkylene group represented by any of $Y^1$ to $Y^3$ does not have a substituent. The alkylene group represented by any of $Y^1$ to $Y^3$ may include an ether bond.

In a case in which any of these groups has a substituent, preferable examples of the substituent include an aryl group having from 6 to 20 carbon atoms, an alkoxy group having from 1 to 8 carbon atoms, a hydroxyl group, a carboxyl group, a halogen atom, an alkyloxycarbonyl group having from 2 to 7 carbon atoms, an alkylcarbonyloxy group having from 2 to 7 carbon atoms, an aryloxycarbonyl group having from 7 to 11 carbon atoms, an arylcarbonyloxy group having from 7 to 11 carbon atoms, an alkylcarbamoyl group having from 1 to 7 carbon atoms and an arylcarbamoyl group having from 7 to 11 carbon atoms. $X^1$ to $X^3$ in Formulae (11) to (13) each independently represent a residue obtained by removing three hydrogen atoms from at least one compound selected from the group consisting of an alkane having from 3 to 10 carbon atoms and a cycloalkane having from 3 to 10 carbon atoms. The residue obtained by removing three hydrogen atoms from at least one compound selected from the group consisting of an alkane having from 3 to 10 carbon atoms and a cycloalkane having from 3 to 10 carbon atoms may be linear or branched. Specific examples thereof include propane, 2-methylpropane, pentane, butane and cyclohexane. $X^1$ to $X^3$ each preferably have from 3 to 7 carbon atoms, and each more preferably have from 3 to 5 carbon atoms.

Specific examples of the repeating unit that is represented by Formula (11) and that may be contained in the urethane compound according to the invention include, but are not limited to, repeating units (L-1) to (L-5) shown below.

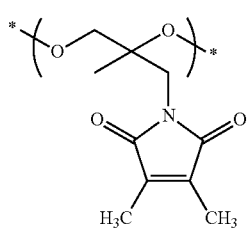

(L-1)

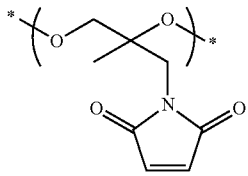

(L-2)

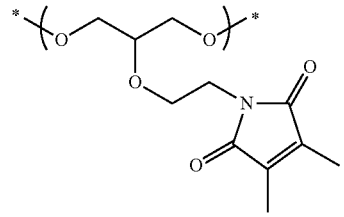

(L-3)

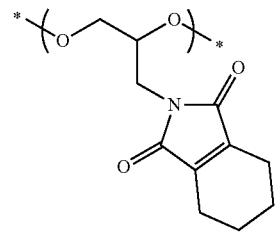

(L-4)

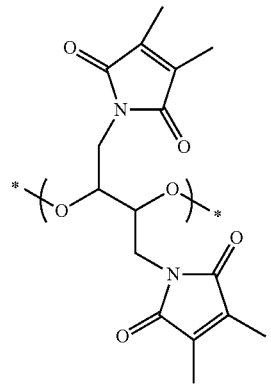

(L-5)

Specific examples of the repeating unit that is represented by Formula (12) and that may be contained in the urethane compound according to the invention include, but are not limited to, repeating units ($L^2$-1) to ($L^2$-2) shown below.

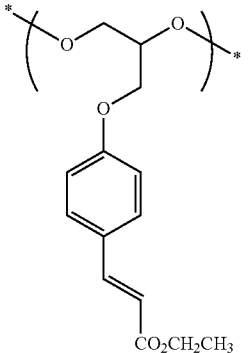

($L^2$-1)

(L²-2)

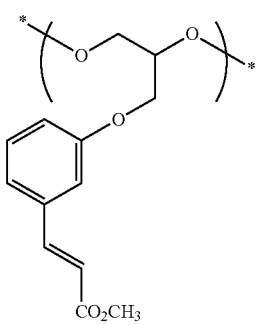

Specific examples of the repeating unit that is represented by Formula (13) and that may be contained in the urethane compound according to the invention include, but are not limited to, repeating units (L³-1) to (L³-3) shown below.

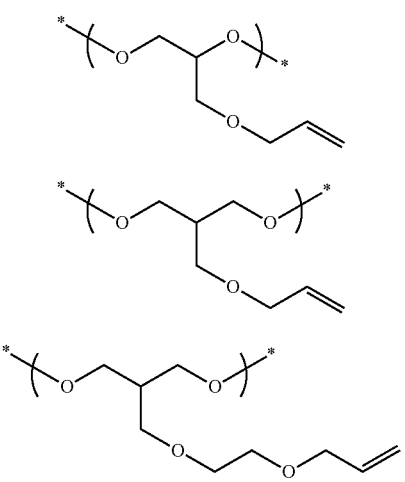

(L³-1)

(L³-2)

(L³-3)

The urethane compound according to the invention particularly preferably includes a structure represented by Formula (11).

Specific examples of an alcohol component which is other than repeating units represented by Formulae (11) to (13), and which may be contained in the urethane compound according to the invention (hereinafter referred to as "alcohol component (b)") include, but are not limited to, repeating units (y-1) to (y-9) shown below.

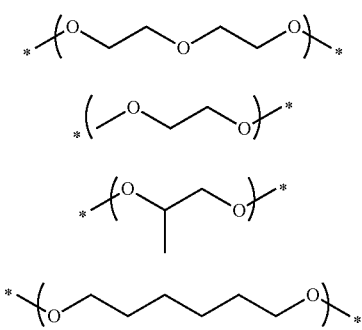

(y-1)

(y-2)

(y-3)

(y-4)

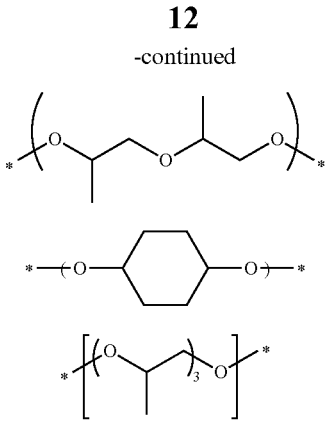

(y-5)

(y-6)

(y-7)

(y-8)

(y-9)

The urethane compound according to the invention includes, in addition to an alcohol component, an isocyanate component, which is hereinafter referred to as "isocyanate component (a). The urethane compound according to the invention preferably includes, as an isocyanate component (a), a repeating unit represented by following Formula (21).

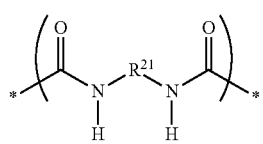

Formula (21)

In Formula (21), $R^{21}$ represents at least one type of group selected from the group consisting of an alkylene group, a cycloalkylene group, an arylene group and a combination thereof.

The alkylene group represented by $R^{21}$ in Formula (21) is preferably an alkylene group having from 1 to 20 carbon atoms, more preferably an alkylene group having from 2 to 16 carbon atoms, and still more preferably an alkylene group having from 2 to 12 carbon atoms. The alkylne group may have a linear structure or a branched structure.

The cycloalkylene group represented by $R^{21}$ in Formula (21) is not limited, and is preferably a cycloalkylene group having from 3 to 15 carbon atoms, such as a cyclopropylene group or a cyclohexylene group. The cycloalkylene group is preferably a cycloalkylene group having from 6 to 10 carbon atoms, and most preferably a cyclohexylene group.

The arylene group represented by $R^{21}$ in Formula (21) is not limited, and is preferably an arylene group having from 6 to 15 carbon atoms, specific examples of which include a phenylene group, a tolylene group, a naphthalenylene group and a biphenylene group.

$R^{21}$ in Formula (21) may represent a combination of at least one alkylene group and at least one cycloalkylene group, a combination of at least one alkylene group and at least one arylene group, a combination of at least one cycloalkylene group and at least one arylene group, or a combination of at least one alkylene group, at least one cycloalkylene group and at least one arylene group. Regarding a preferable combination of groups, at least one of the following combinations is preferable:

a combination of at least one cycloalkylene group and at least one alkylene group; or a combination of at least one cycloalkylene group and at least one arylene group.

A combination of one cycloalkylene group having from 6 to 10 carbon atoms and one alkylene group having from 2 to 12 carbon atoms is more preferable.

The group represented by $R^{21}$ in Formula (21) may or may not have a substituent, and preferably has a substituent.

In a case in which these groups have a substituent, preferable examples of the substituent include an alkyl group having from 1 to 8 carbon atoms, an aryl group having from 6 to 20 carbon atoms, an alkoxy group having from 1 to 8 carbon atoms, a hydroxyl group, a carboxyl group, a halogen atom, an alkyloxycarbonyl group having from 2 to 7 carbon atoms, an alkylcarbonyloxy group having from 2 to 7 carbon atoms, an aryloxycarbonyl group having from 7 to 11 carbon atoms, an arylcarbonyloxy group having from 7 to 11 carbon atoms, an alkylcarbamoyl group having from 1 to 7 carbon atoms and an arylcarbamoyl group having from 7 to 11 carbon atoms. The substituent is more preferably an alkyl group having from 1 to 4 carbon atoms, and most preferably an alkyl group having one carbon atom, i.e., a methyl group.

$R^{21}$ in Formula (21) preferably represents a cycloalkylene group, a combination of at least one cycloalkylene group and at least one alkylene group, or a combination of at least one cycloalkylne group and at least one arylene group.

Specific examples of the repeating unit that is represented by Formula (21) and that may be contained in the urethane compound according to the invention include, but are not limited to, repeating units (Z-1) to (Z-13) shown below.

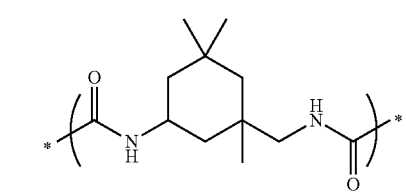
(Z-1)

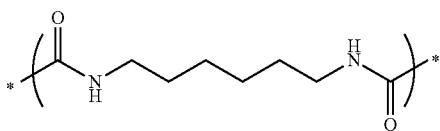
(Z-2)

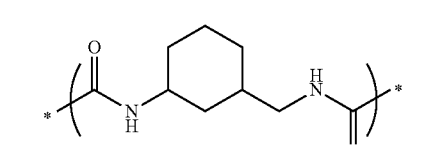
(Z-3)

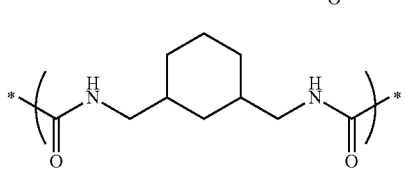
(Z-4)

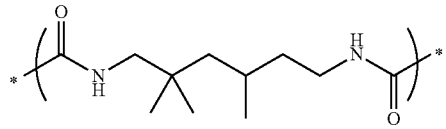
(Z-5)

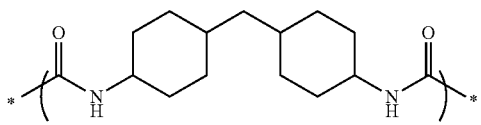
(Z-6)

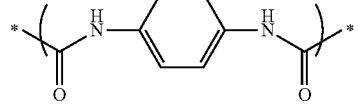
(Z-7)

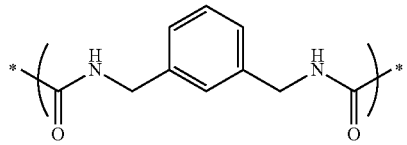
(Z-8)

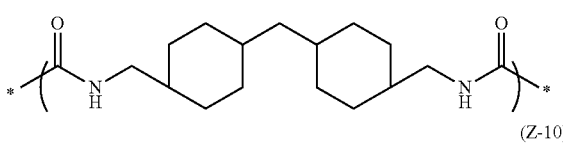
(Z-9)

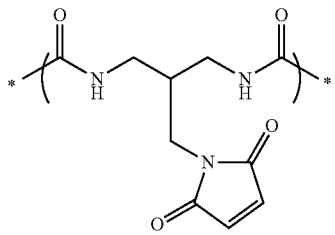
(Z-10)

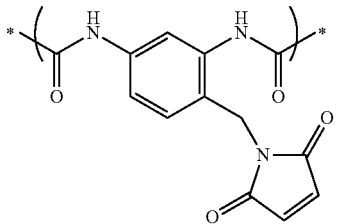
(Z-11)

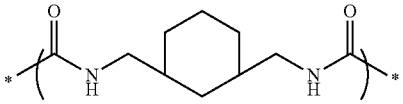
(Z-12)

(Z-13)

A terminal group of the urethane compound according to the invention is not limited. Examples of the terminal group include an alkoxy group, a cycloalkyl group and an alkylamino group. The terminal group is preferably an alkoxy group.

The alkoxy group as a terminal group of the urethane compound is not limited. The alkoxy group may be an alkoxy group having from 1 to 8 carbon atoms, and may have a linear structure or a branched structure. Specific examples thereof include a methoxy group, an ethoxy group, a propyloxy group, an isopropyloxy group and a butoxy group.

The cycloalkoxy group as a terminal group of the urethane compound is not limited. The cycloalkoxy group may be a cycloalkoxy group having from 1 to 10 carbon atoms, examples of which include a cyclohexyloxy group, a cyclopentyloxy group and a cyclohexylmethoxy group.

The alkylamino group as a terminal group of the urethane compound is not limited. The alkylamino group may be an alkylamino group having from 1 to 8 carbon atoms, and may have a linear structure or a branched structure. Specific examples thereof include a methylamino group, a dimethylamino group, an ethylamino group, a propylamino group, an isopropylamino group, a morpholino group and a pyperidino group.

The cycloalkylamino group as a terminal group of the urethane compound is not particularly limited, and may be a cycloalkylamino group having from 1 to 10 carbon atoms. Examples thereof include a cyclohexylamino group, a cyclopentylamino group and a cyclohexylmethylamino group.

The urethane compound according to the invention may be, but not limited to, a three-component urethane compound obtained by copolymerization of at least one isocyanate component (a), at least one alcohol component (b) and at least one alcohol component (c) having a structure represented by Formula (11), (12) or (13), or a two-component urethane compound obtained by copolymerization of at least one isocyanate component (a) and at least one alcohol component (c). The urethane compound according to the invention is preferably the three-component urethane compound.

Let assume that the copolymerization ratio of isocyanate component (a) in the urethane compound according to the invention is represented by a, the copolymerization ratio of alcohol component (b) in the urethane compound is represented by b, and the copolymerization ratio of alcohol component (c) in the urethane compound is represented by c. With respect to the copolymerization ratios, in a case in which the urethane compound according to the invention is a three-component urethane compound, the total sum of a, b and c is 100. In a case in which the urethane compound according to the invention is a two-component urethane compound, the total sum of a and either one of b or c is 100. Here, a, b and c represents copolymerization ratios by mol.

In the urethane compound according to the invention, the copolymerization ratio represented by b is preferably in the range of $0 \leq b \leq 45$, and more preferably in the range of $10 \leq b \leq 40$.

In the urethane compound according to the invention, the copolymerization ratio represented by c is preferably in the range of $5 \leq c \leq 50$, and more preferably in the range of $10 \leq c \leq 40$.

Exemplary urethane compounds (U-1) to (U-9), which are specific examples of the urethane compound according to the invention, are shown below. However, the specific polymerizable compound in the invention is not limited thereto.

-continued

| Exemplary Compound | Isocyanate Component (a) | Alcohol Component (b) | Alcohol Component (c) | (a:b:c) | Weight Average Molecular Weight |
|---|---|---|---|---|---|
| (U-4) | isophorone diisocyanate-derived urea linkage structure | *(OCH2CH2OCH2CH2OCH2CH2O)b* | *(OCH2CH(CH2OCH2CH=CH2)O)c* | (50:30:20) | 5300 |
| (U-5) | hexamethylene diisocyanate-derived urea linkage structure | *(OCH2CH2OCH2CH2OCH2CH2O)b* | *(OCH2C(CH3)(CH2-N(dimethylmaleimide))CH2O)c* | (50:30:20) | 5500 |
| (U-6) | isophorone diisocyanate-derived urea linkage structure | Not Contained | *(OCH2C(CH3)(CH2-N(dimethylmaleimide))CH2O)c* | (50:0:50) | 5300 |

| Exemplary Compound | Isocyanate Component (a) | Isocyanate Component (a') | Alcohol Component (b) |
|---|---|---|---|
| (U-7) | maleimide-substituted diisocyanate structure | isophorone diisocyanate-derived urea linkage structure | *(OCH2CH2OCH2CH2OCH2CH2O)b* |

| Exemplary Compound | Alcohol Component (c) | (a:a':b:c) | Weight Average Molecular Weight |
|---|---|---|---|
| (U-7) | *(OCH2-cyclohexane-CH2O)c* | (20:30:30:20) | 5500 |

| Exemplary Compound | Isocyanate Component (a) | Alcohol Component (b) | Alcohol Component (c) | (a:b:c) | Number Average Molecular Weight |
|---|---|---|---|---|---|
| (U-8) | | | | (50:30:20) | 17400 |
| (U-9) | | | | (50:30:20) | 800 |

Urethane compounds (U-1) to (U-7) are preferred for used in the invention.

The urethane compound according to the invention can be synthesized using, as a precursor, a diol compound having a reactive group represented by Formula (1), (2) or (3).

When syntheizing a compound having a group represented by Formula (1) at a side chain, a diol having a maleimide group can be used as a precursor in accordance with the method described in *Tetrahedron*, vol. 58, page 7049 (2002).

When synthesizing a compound having a group represented by Formula (2) at a side chain, a diol compound obtained by hydrolyzing the epoxy group of a compound having an epoxy group and a group represented by Formula (2) by an ordinary method can be used as a precursor in accordance with the method described in *Journal of Medicinal Chemistry* vol. 25, page 1408 (1982).

When synthesizing a compound having a group represented by Formula (3) at a side chain, a diol compound having an allyl ether group, such as 3-allyloxy-1,2-propanediol (such as a product manufactured by Wako Pure Chemical Industries, Ltd.), can be used as a precursor.

The urethane compound according to the invention can be produced using a diol compound having a group represented by Formula (1), (2) or (3) at a side chain and a diisocyanate compound, according to a commonly-used method, for which *J. Polym. Sci.*, 45, 49 (1960) and JP-A No. 2006-45362 can be referenced.

The content of the urethane compound according to the invention in the ink composition is preferably from 6 to 40% by mass, more preferably from 10 to 30% by mass, and most preferably from 12 to 25% by mass, relative to the entire amount of the ink composition. A content of the urethane compound of 6% by mass or more is preferable from the viewpoints of adhesiveness and solvent resistance, and a content of the urethane compound of 40% by mass or less is preferable from the viewpoint of ejection stability.

In the invention, a study was made on ink compositions suitable for inkjet recording; as a result, the inventor found that the storage stability of the ink composition and the solvent resistance of printed articles can be improved by using a urethane compound having at least one type of group selected from the group consisting of the groups represented by the Formulae (1) to (3) above at one or more side chains thereof. Although the mechanism of the improvement has not become clear, it is presumed that since each of the groups represented by Formulae (1) to (3) has properties such that the group undergoes a crosslinking reaction through [2+2] cycloaddition reaction when exposed to an active energy radiation, a crosslinked structure can be formed after ejection, and thus the solvent resistance of the resultant printed article can be improved.

((Component B) Organic Solvent)

The ink composition according to the invention includes an organic solvent.

The organic solvent according to the invention is preferably a non-polymerizable organic solvent that does not substantially polymerize, and more preferably at least one type of organic solvent selected from the group consisting of following Formula (I) and (II).

Formula (I)

In Formula (1), $R^{11}$ and $R^{12}$ each independently represent —$CH_2$—, —$NR^{14}$— or —O—, provided that $R^{11}$ and $R^{12}$ are not both simultaneously —$CH_2$—; $R^{14}$ represents an alkyl group having from 1 to 3 carbon atoms, a hydroxyalkyl group having from 1 to 3 carbon atoms, a hydroxyl group or a hydrogen atom; $R^{13}$ represents a hydrocarbon group represented by —$C_mH_{2m}$—, —$C_mH_{2m-2}$— or —$C_mH_{2m-4}$—, and m represents an integer of from 2 to 8.

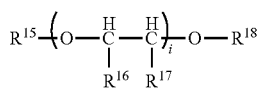
Formula (II)

In Formula (II), $R^{15}$, $R^{16}$, $R^{17}$ and $R^{18}$ each independently represent a hydrogen atom, a methyl group, an ethyl group or an acetyl group; and i represents an integer of from 1 to 3.

$R^{11}$ and $R^{12}$ in Formula (1) each independently represent —$CH_2$—, —$NR^{14}$— or —O—, provided that $R^{11}$ and $R^{12}$ are not both simultaneously —$CH_2$—. The combination of $R^{11}$ and $R^{12}$ in Formula (1) is preferably a combination in which each of $R^{11}$ and $R^{12}$ is —$NR^{14}$—, a combination in which each of $R^{11}$ and $R^{12}$ is —O— or a combination in which $R^{11}$ is —$CH_2$— and $R^{12}$ is —O—.

$R^{14}$ in Formula (1) represents an alkyl group having from 1 to 3 carbon atoms, a hydroxyalkyl group having from 1 to 3 carbon atoms, a hydroxyl group or a hydrogen atom. $R^{14}$ may or may not have a substituent. $R^{14}$ in Formula (1) is preferably an alkyl group having from 1 to 3 carbon atoms or a hydrogen atom.

$R^{13}$ in Formula (1) represents a hydrocarbon group represented by —$C_mH_{2m}$—, —$C_mH_{2m-2}$— or —$C_mH_{2m-4}$—, and m represents an integer of from 2 to 8. Here, m in $R^{13}$ is preferably an integer of from 2 to 6, more preferably an integer of from 2 to 4, and particularly preferably from 2 or 3. $R^{13}$ is preferably —$C_mH_{2m}$— or —$C_mH_{2m-2}$—, and more preferably —$C_mH_{2m}$—. $R^{13}$ may be linear or branched.

Preferable specific examples of $R^{13}$ include an ethylene group, a 1-methylethylene group and a propylene group. Among them, an ethylene group or a 1-methylethylene group is particularly preferable.

The organic solvent represented by Formula (1) is more preferably an organic solvent represented by following Formulae (Ia), (Ib) or (Ic).

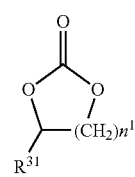
Formula (Ia)

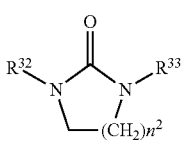
Formula (Ib)

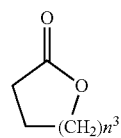
Formula (Ic)

$R^{31}$, $R^{32}$, and $R^{33}$ in Formulae (Ia), (Ib) and (Ic) each independently represents a hydrogen atom, a methyl group or an ethyl group.

Further, $n^1$, $n^2$ and $n^3$ in Formulae (Ia), (Ib) and (Ic) each independently represent an integer of from 1 to 3.

Specific examples of the organic solvent represented by Formula (Ia) include ethylene carbonate and propylene carbonate. The organic solvent represented by Formula (Ia) is preferably propylene carbonate.

Specific examples of the organic solvent represented by Formula (Ib) include 1,3-dimethyl-2-imidazolidinone and 1,3-diethyl-2-imidazolidinone. The organic solvent represented by Formula (Ib) is preferably 1,3-dimethyl-2-imidazolidinone.

Specific examples of the organic solvent represented by Formula (Ic) include γ-butyrolactone and ε-caprolactone. The organic solvent represented by Formula (Ic) is preferably γ-butyrolactone.

The organic solvent represented by Formula (1) is particularly preferably represented by Formula (Ia).

In Formula (II), $R^{15}$, $R^{16}$, $R^{17}$ and $R^{18}$ each independently represent a hydrogen atom, a methyl group, an ethyl group or an acetyl group; $R^{15}$ and $R^{18}$ each independently represent preferably a methyl group or an ethyl group, and $R^{16}$ and $R^{17}$ each independently represent preferably a hydrogen atom or a methyl group.

In Formula (II), i represents an integer of from 1 to 3.

Specific examples of the organic solvent represented by Formula (II) include diethyleneglycol diethyl ether, triethyleneglycol dimethyl ether and ethyleneglycol diacetate. The organic solvent represented by Formula (II) is preferably diethyleneglycol diethyl ether.

In the invention, the content of organic solvent (component (B)) in the ink composition is preferably from 50% by mass to 90% by mass, and more preferably from 60% by mass to 85% by mass, relative to the entire amount of the ink composition.

Further, in a case where two or more organic solvent (component (B)) are used in the ink composition, a total content of the two or more organic solvent is preferably from 50% by mass to 90% by mass, and more preferably from 60% by mass to 85% by mass, relative to the entire amount of the ink composition.

Organic solvents represented by Formula (1) are more preferable for use in the invention.

<Coloring Agent>

It is not essential for the ink composition according to the invention to be used for forming a colored image. However, when the ink composition is used for forming a colored image, the ink composition may include a coloring agent.

Coloring agents that can be used in the invention are not particularly limited. The coloring agent to be used may be selected from any known coloring agents such as pigments, oil-soluble dyes, water-soluble dyes, and disperse dyes. Among them, the coloring agent is preferably selected form pigment and oil-soluble dyes, which have excellent weather resistance and excellent color reproducibility, and the coloring agent is more preferably a pigment.

—Pigment—

Pigments that can be used in the invention are not particularly limited, and the organic or inorganic pigments having the following numbers described in the Color Index may be used.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, Pigment Orange 13, 16, 20, and 36.

Examples of blue or cyan pigments include Pigment Blue 1, 15, 15:1, 15:2, 15:3, 15:4, 15:6, 16, 17-1, 22, 27, 28, 29, 36, and 60.

Examples of green pigments include Pigment Green 7, 26, 36, and 50.

Examples of yellow pigments include Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, and 193. Pigment Yellow 120, 155, and 180 are preferable.

Examples of black pigments include Pigment Black 7, 28 and 26.

Examples of white pigments include Pigment White 6, 18, and 21.

The coloring agent to be used may be appropriately selected from these pigments, in accordance with the purpose.

—Oil-Soluble Dye—

Oil-soluble dyes that can be used in the invention are described below.

From among oil-soluble dyes that can be used in the invention, any yellow oil-soluble dyes can be used as yellow dyes. Examples of yellow oil-soluble dyes include: aryl- or heteryl-azo dyes having a coupling component selected from, for example, phenols, naphthols, anilines, pyrazolones, pyridones, and open-chain active methylene compounds; azo methine dyes having a coupling component that may be selected from open-chain active methylene compounds; methine dyes such as benzylidene dyes and monomethine oxonol dyes; and quinoene dyes such as naphthoquinone dyes and anthraquinone dyes, and further include quinophthalone dyes, nitro/nitroso dyes, acridine dyes and acridinone dyes.

From among oil-soluble dyes that can be used in the invention, any magenta oil-soluble dyes can be used as magenta dyes. Examples of magenta oil-soluble dyes include: aryl- or heteryl-azo dyes having a coupling component selected from, for example, phenols, naphthols and anilines; azo methine dyes having a coupling component selected from pyrazolones and pyrazolotriazoles; methine dyes such as arylidene dyes, styryl dyes, merocyanine dyes and oxonol dyes; carbonium dyes such as diphenylmethane dyes, triphenylmethane dyes and xanthene dyes; quinone dyes such as naphthoquinone, anthraquinone and anthrapyridone; and condensed polycyclic dyes such as dioxazine dyes.

From among oil-soluble dyes that can be used in the invention, any cyan oil-soluble dyes can be used as cyan dyes. Examples of cyan oil-soluble dyes include: indoaniline dyes, indophenol dyes, and azomethine dyes having a coupling component selected from pyrrolotriazoles; polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; aryl- or heteryl-azo dyes having a coupling component selected from, for example, phenols, naphthols and anilines; and indigo/thioindigo dyes.

The dyes described above each may be a compound that becomes to assume a color of yellow, magenta or cyan only after dissociation of a part of its chromophore (chromogenic atomic group). In this case, the counter-cation may be an inorganic cation such as an alkali metal or ammonium, or an organic cation such as pyridinium or a quaternary ammonium salt, or a polymer cation that includes a cation, such as those described above, in its structure.

Preferable specific examples of oil-soluble dyes include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2.

From among these, NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (tradenames, manufactured by Orient Chemical Industries Co., Ltd.), AIZEN SPILON BLUE GNH (tradenames, manufactured by Hodogaya Chemical Co., LTD.), NEOPEN YELLOW 075, NEOPEN MAZENTA SE1378, NEOPEN BLUE 808, NEOPEN BLUE FF4012, and NEOPEN CYAN FF4238 (tradenames, manufactured by BASF Japan Ltd.) are particularly preferable.

—Disperse Dyes—

In the invention, it is also possible to use a disperse dye as long as the disperse dye dissolves in a water-immiscible organic solvent. The scope of disperse dyes generally includes water-soluble dyes. However, in the invention, the disperse dye is preferably used in a range in which the disperse dye dissolves in a water-immiscible organic solvent.

Preferable specific examples of disperse dyes include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

The coloring agent for use in the invention is preferably subjected to dispersing treatment after the coloring agent is added to the ink composition according to the invention, such that the coloring agent is dispersed in the ink composition to an appropriate degree. The dispersing of the coloring agent can be carried out using a disperser such as a ball mill, a sand mill, an Attritor, a roll mill, an agitator, a Henschel mixer, a colloid mill, a ultrasonic homogenizer, a pearl mill, a wet-type jet mill, and a paint shaker.

In the case of dispersing the coloring agent, a dispersant may be added to form a dispersion (mill base). The dispersant is not particularly limited in terms of the type thereof, and the dispersant is preferably a polymeric dispersant. Examples of polymeric dispersants include SOLSPERSE series products produced by Noveon Inc. Synergists suitable for the respective pigments may be used as dispersion aids. In the invention, the content of dispersants and dispersion aids is preferably from 1 to 50 parts by mass relative to 100 parts by mass of coloring agent.

When preparing the ink composition according to the invention, the coloring agent may be directly added together with other components. Alternatively, in order to improve the dispersibility of the coloring agent, the coloring agent may be added to a dispersion medium, such as a solvent or a polymerizable compound, and uniformly dispersed or dissolved, and thereafter blended with other components.

One type of, or two or more types of, coloring agent may be appropriately selected for use, in accordance with the purpose of the use of the ink composition.

In a case in which a coloring agent that remains in the solid state when contained in the ink composition according to the invention, such as a pigment, is used, selection of the coloring agent, the dispersant and the dispersion medium and the setting of the dispersion conditions and the filtration conditions are preferably carried out such that the average particle diameter of the pigment particles would be preferably from 0.005 to 0.5 μm, more preferably from 0.01 to 0.45 μm, and still more preferably from 0.015 to 0.4 μm. The control of the particle diameter in this manner is preferable since the control of the particle diameter suppresses clogging of the head nozzle, and allows the storage stability, transparency and curing sensitivity of the ink composition to be maintained.

The content of coloring agent in the ink composition according to the invention may be suitably selected in accordance with the purpose of the use of the ink composition. In consideration of the physical properties and coloring properties of the ink composition, it is generally preferable that the content of coloring agent is from 0.5 to 10% by mass relative to the entire mass of the ink composition.

In a case in which the ink composition according to the invention is a white ink composition containing a white pigment such as titanium oxide as a coloring agent, the content of coloring agent in the ink composition is preferably from 5 to 30% by mass, and more preferably from 10 to 25% by mass, relative to the entire mass of the ink composition, in order to ensure that sufficient light-shielding properties are obtained.

<Water>

The ink composition according to the invention is preferably a non-aqueous ink composition that does not substantially include water. Specifically, the content of water is preferably 5% by mass or less, and more preferably 1% by mass, relative to the entire amount of the ink composition.

<Sensitizing Dye>

The ink composition according to the invention may further include a sensitizing dye. The sensitizing dye gets into an electronically-excited state by absorbing a specific active energy radiation.

The sensitizing dye to be used may be a compound that is suitable for the wavelength of the active energy radiation. In a case in which the sensitizing dye is used for a curing reaction of a general ink composition, examples of preferable sensitizing dyes include sensitizing dyes that have absorption wavelengths within a wavelength range of from 350 nm to 450 nm, and that belong to the following classes of compounds: polynuclear aromatic compounds (such as anthracene, pyrene, perylene and triphenylene), thioxanthones (such as isopropylthioxanthone), xanthenes (such as fluorescein, eosine, erythrosine, rhodamine B and rose bengal), cyanines (such as thiacarbocyanine and oxacarbocyanine), merocyanines (such as merocyanine and carbomerocyanine), thiazines (such as thionine, methylene blue and toluidine blue), acridines (such as acridine orange, chloroflavin and acriflavin), anthraquinones (such as anthraquinone), squaryliums (such as squarylium) and coumarines (such as 7-diethylamino-4-methylcoumarine).

Polynuclear aromatic compounds and thioxanthones are preferable classes of compounds, and thioxanthones are more preferable, and isopropylthioxanthone is most preferable.

<Cosensitizer>

The ink composition according to the invention may further include a cosensitizer. In the invention, the cosensitizer exerts effects such as further improvement of the sensitivity of the sensitizing dye against an active energy radiation or suppression of polymerization inhibitory effects of oxygen on the polymerizable compound.

Examples of the cosensitizer include amines such as the compounds described in M. R. Sander et al., *Journal of Polymer Science*, vol. 10, page 3173 (1972), Japanese Examined Patent Application Publication (JP-B) No. 44-20189, JP-A No. 51-82102, JP-A No. 52-134692, JP-A No. 59-138205, JP-A No. 60-84305, JP-A No. 62-18537, JP-A No. 64-33104, and Research Disclosure 33825. Specific examples thereof include triethanolamine, ethyl p-dimethylaminobenzoate, p-formyldimethylaniline and p-methylthiodimethylaniline.

Other examples of the cosensitizer include thiols and sulfides, such as thiol compounds described in JP-A No. 53-702, JP-B No. 55-500806, and JP-A No. 5-142772, and disulfide compounds described in JP-A No. 56-75643. Specific examples thereof include 2-mercaptobenzothiazole, 2-mercaptobenzoxazol, 2-mercaptobenzimidazole, 2-mercapto-4 (3H)-quinazoline and β-mercaptonaphthalene.

Still other examples of the cosensitizer include amino acid compounds (such as N-phenylglycine), organic metal compounds described in JP-B No. 48-42965 (such as tributyltin acetate), hydrogen donors described in JP-B No. 55-34414, sulfur compounds described in JP-A No. 6-308727 (such as trithiane), phosphorus compounds described in JP-A No. 6-250387 (such as diethylphosphite), and Si—H compounds and Ge—H compounds.

<Polymer Binder>

The ink composition according to the invention may further include a polymer binder. The polymer binder may be, without limitation, any polymer compound that can be dissolved or dispersed in the ink composition, and that serves as a coating film after image formation. Specific examples thereof include polyacrylate, polyurethane, polyester and polyether. The polymer binder to be used is preferably a polyacrylate that is a homopolymer or copolymer of an alkyl (meth)acrylate. The ink composition according to the invention preferably includes a polymer binder from the viewpoint of controlling the properties of an ink film after image formation.

<Other Components>

The ink composition for inkjet recording according to the invention may further include one or more other components, as necessary. Examples of other components include a polymerization inhibitor.

The polymerization initiator is added with a view to improving the storage stability. The ink composition for inkjet recording according to the invention is preferably ejected after being heated to a temperature within the range of from 40° C. to 80° C. for viscosity reduction. Therefore, the addition of a polymerization inhibitor is preferable also from the viewpoint of preventing head clogging due to thermal polymerization. The polymerization inhibitor may be added to the ink composition according to the invention such that the content of polymerization inhibitor in the ink composition is preferably from 200 to 20,000 ppm relative to the entire amount of the ink composition. Examples of the polymerization inhibitor include hydroquinone, benzoquinone, p-methoxyphenol, 2,2,6,6-tetramethylpyperidine-1-oxyl and 4-hydroxyl-2,2,6,6-tetramethylpiperidine-1-oxyl.

Besides the above, known compounds may be incorporated into the ink composition for inkjet recording according to the invention, as necessary. For example, compounds to be incorporated into the ink composition may be appropriately selected from surfactants, leveling additives, matte agents, polyester resins for controlling film properties, rubber resins and waxes. Further, it is also preferable for the ink composition to include a tackifier that does not inhibit polymerization, in order to improve adhesiveness to a recording medium such as polyolefine or PET. Specific examples of the tackifier include high-molecular tacky polymers described in pages 5 to 6 of JP-A No. 2001-49200 (such as a copolymer composed of an ester of (meth)acrylic acid and an alcohol having an alkyl group having from 1 to 20 carbon atoms, an ester of (meth)acrylic acid and alicyclic alcohol having from 3 to 14 carbon atoms and an ester of (meth)acrylic acid and an aromatic alcohol having from 6 to 14 carbon atoms), and low-molecular tackiness-imparting resins having a polymerizable unsaturated bond.

[Properties of Ink Composition]

The ink composition according to the invention has active-energy-curability as described above. The manner of image formation using the ink composition is not particularly limited, and the ink composition can be applied to general coating methods, transfer methods and inkjet recording methods. In a preferable embodiment of the invention, the proportion of polymerizable compound to the entire ink composition is 60% by mass or higher, which means that the content of low-molecular compounds is high. Therefore, in this embodiment, the ink composition can suitably be used for inkjet recording, from the viewpoint of viscosity.

In the following, properties of the ink composition according to the invention that are preferred in a case in which the ink composition is used for inkjet recording are described.

In consideration of ejection stability, the viscosity of the ink composition according to the invention at an ejection temperature (for example, from 25° C. to 60° C., and more preferably from 25° C. to 50° C.) is preferably from 5 to 30 mPa·s, and more preferably from 7 to 25 mPa·s. For example, the viscosity of the ink composition according to the invention at room temperature (from 25° C. to 30° C.) is preferably from 10 to 50 mPa·s, and more preferably from 12 to 40 mPa·s.

The compositional ratios of the components of the ink composition according to the invention is preferably appropriately adjusted such that the viscosity of the ink composition is within the range described above. By setting the viscosity of the ink composition at room temperature to be high, ink penetration into a recording medium can be prevented even in a case in which a porous recording medium is used, and the amount of uncured monomers and odor can be reduced. Further, ink bleeding upon spotting of ink droplets can be suppressed, as a result of which image quality can be improved.

The surface tension of the ink composition according to the invention is preferably from 20 to 30 mN/m, and more preferably from 23 to 28 mN/m. In the case of recording on various recording media such as polyolefine, PET, coated paper and non-coated paper, the surface tension of the ink composition according to the invention is preferably 20 mN/m or higher from the viewpoint of prevention of bleed and penetration, and is preferably 30 mN/m or lower from the viewpoint of wettability.

[Inkjet Recording Method]

The inkjet recording method according to the invention includes an ink application process of applying the ink composition for inkjet recording onto a recording medium, and an active energy radiation irradiation process of irradiating the ink composition with an active energy radiation. Through these processes, an image formed from the ink composition fixed onto a recording medium can be formed.

<Ink Application Process>

The ink application process in the inkjet recording method according to the invention is described below. The ink application process in the invention may be, without limitation, any process that includes applying the ink composition for inkjet recording onto a recording medium.

The inkjet recording apparatus used in the inkjet recording method according to the invention is not particularly limited, and may be freely selected from known inkjet recording apparatuses capable of achieving a desired resolution. In other words, known inkjet recording apparatuses, including commercially products, are all applicable to the ejection of the ink composition onto a recording medium in the inkjet recording method according to the invention.

An exemplary inkjet recording apparatus that can be used in the invention is an apparatus including an ink supply system, a temperature sensor and a heating device.

The ink supply system may include, for example, a primary tank that holds the ink composition according to the invention, a supply pipe, an ink supply tank directly upstream the inkjet head, a filter and a piezoelectric inkjet head. The piezoelectric inkjet head may be driven to eject ink droplets for forming multi-size dots of preferably from 1 to 100 µl, and more preferably from 8 to 30 pl, at a resolution of preferably from 320×320 dpi to 4,000×4,000 dpi, more preferably from 400×400 dpi to 1,600×1,600 dpi, and still more preferably from 720×720 dpi. As used herein, "dpi" refers to the number of dots per 2.54 cm.

When ejected, the ink composition according to the invention is preferably maintained at a constant temperature. Therefore, the inkjet recording apparatus preferably includes a device that stabilizes the temperature of the ink composition. The region in which the ink composition is maintained at a constant temperature may be all of the piping system and members from the ink tank (or an intermediate tank if the inkjet recording apparatus includes the intermediate tank) to the nozzle ejection face. In other words, the region ranging from the ink supply tank to the inkjet head may be thermally insulated and heated.

The method for the temperature control is not particularly limited. For example, it is preferable that plural temperature sensors are provided at respective pipe portions, and that control of heating is carried out in accordance with the flow rate of the ink composition and the environmental temperature. The temperature sensors may be provided at the ink supply tank and at or around a nozzle of the inkjet head. The head unit to be heated is preferably thermally shielded or thermally insulated, so as to prevent the head unit device from being affected by the temperature of the atmosphere. It is preferable that the head unit is thermally insulated from other portions of the inkjet recording apparatus, and that the entire heat capacity of the heating unit is reduced, in order to shorten the printer start-up time required for heating, and to decrease the loss of thermal energy.

In a case in which the above inkjet recording apparatus is used to eject the ink composition, the ink composition is ejected preferably after the viscosity of the ink composition is decreased to be in the range of from 3 to 15 mPa·s, more preferably in the range of from 3 to 13 mPa·s, by heating the ink composition to a temperature of from 25° C. to 80° C., more preferably from 25° C. to 50° C. In particular, in a case in which the ink composition according to the invention has a viscosity at 25° C. of 50 mPa·s or lower, the ink composition can be ejected satisfactorily. Therefore, the ink composition according to the invention preferably has a viscosity at 25° C. of 50 mPa·s or lower. According to this method, high ejection stability can be realized.

A fluctuation of the viscosity of the ink composition exerts great influence on a change in the liquid droplet size and a change in the liquid ejection speed, which leads to deterioration of image quality. Therefore, it is preferable that the temperature of the ink composition at the time of ejection be maintained as constant as possible. Therefore, in the invention, the temperature of the ink composition is preferably controlled to be in the range of from (set temperature −5° C.) to (set temperature +5° C.), more preferably in the range of from (set temperature −2° C.) to (set temperature +2° C.), and still more preferably in the range of from (set temperature −1° C.) to (set temperature +1° C.).

The recording medium in the invention is not particularly limited, and recording media that are known as supports or recording materials can be used. Examples of the recording medium include paper, paper on which a plastic (such as polyethylene, polypropylene or polystyrene) is laminated, a metal plate (such as of aluminum, zinc or copper), a plastic film (such as of polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate or polyvinyl acetal), paper on which any of the above metals is laminated or deposited and a plastic film on which any of the above metals is laminated or deposited. In particular, since the ink composition according to the invention has excellent adhesiveness, the ink composition can be suitably used for image recording on a non-absorbent recording medium as a recording medium. From the viewpoint of adhesiveness, a plastic substrate such as of polyvinyl chloride, polyethylene terephthalate or polyethylene is preferable, polyvinyl chloride resin substrate is more preferable, and a polyvinyl chloride resin sheet or film is still more preferable.

<Active Energy Radiation Irradiation process>

The active energy radiation irradiation process in the inkjet recording method according to the invention is described below. The active energy radiation irradiation process in the invention may be, without limitation, any process that includes irradiating the ink composition for inkjet recording applied onto the recording medium with an active energy radiation. The irradiation of the ink composition according to the invention with an active energy radiation allows a crosslinking reaction of compounds in the ink composition to proceed, thereby enabling fixing of an image and an improvement of the solvent resistance or the like of the resultant printed article. The active energy radiation irradiation process causes a crosslinking reaction of the (Component A), and a crosslinking structure is formed in the ink composition. For example, in a case in which a group represented by Formula (1) undergoes a crosslinking reaction, a crosslinked structure represented by following Formula (41) is formed in the ink composition. However, the crosslinking structure in the invention is not limited thereto.

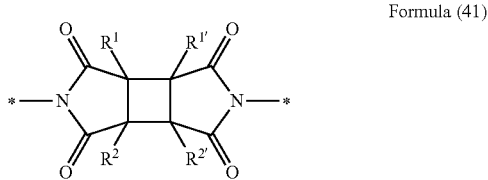

Formula (41)

In Formula (41), $R^1$, $R^2$, $R^{1\prime}$ and $R^{2\prime}$ each independently represent a hydrogen atom or an alkyl group, and $R^1$ and $R^2$ may be bonded to each other to form a 4- to 6-membered ring. The positions of $R^{1\prime}$ and $R^{2\prime}$ may be interchanged. $R^{1\prime}$ and $R^{2\prime}$ may be bonded to each other to form a 4- to 6-membered ring. The specifics, including preferable ranges, of $R^1$ and $R^2$ are the same as the specifics, including preferable ranges, of $R^1$ and $R^2$ in Formula (1), respectively. The specifics, including preferable ranges, of $R^{1\prime}$ are the same as the specifics, including preferable ranges, of $R^1$ in Formula (1). The specifics, including preferable ranges, of $R^{2\prime}$ are the same as the specifics, including preferable ranges, of $R^2$ in Formula (1).

In a case in which a group represented by Formula (2) undergoes a crosslinking reaction due to the irradiation of an active energy radiation, a crosslinked structure represented by following Formula (42) may, for example, be formed.

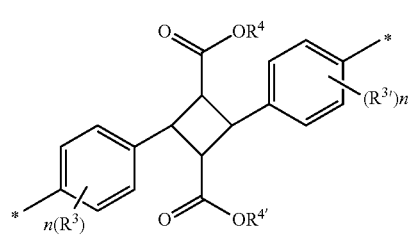

Formula (42)

In Formula (42), $R^3$ and $R^{3\prime}$ each independently represent a hydrogen atom, an alkyl group, an alkoxy group, an aryloxy group, an alkoxycarbonyl group, an aryloxycarbonyl group or a halogen atom, and $R^3$s may be bonded to each other to form a ring. $R^4$ and $R^{4\prime}$ each independently represent a hydrogen atom, an alkyl group or an aryl group. The specifics, including preferable ranges, of $R^3$ and $R^{3\prime}$ are the same as the specifics, including preferable ranges, of $R^3$ in Formula (2). The specifics, including preferable ranges, of $R^4$ and $R^{4\prime}$ are the same as the specifics, including preferable ranges, of $R^4$ in Formula (2).

In a case in which a group represented by Formula (3) undergoes a crosslinking reaction due to the irradiation of an active energy radiation, a crosslinked structure represented by Formula (43) may, for example, be formed.

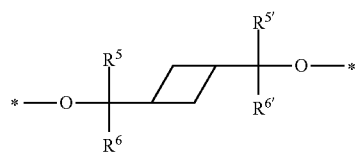

Formula (43)

In Formula (43), $R^5$, $R^6$, $R^{5\prime}$ and $R^{6\prime}$ each independently represent a hydrogen atom, an alkyl group or an aryl group, and $R^5$ and $R^6$ may be bonded to each other to form a ring. $R^{5\prime}$ and $R^{6\prime}$ may be bonded to each other to form a ring. The specifics, including preferable ranges, of $R^5$ and $R^{5\prime}$ are the same as the specifics, including preferable ranges, of $R^5$ in Formula (3). The specifics, including preferable ranges, of $R^4$ and $R^{4\prime}$ are the same as the specifics, including preferable ranges, of $R^4$ in Formula (3).

Active energy radiations that can be used in the active energy radiation irradiation process include ultraviolet light, visible light and electron beams. The active energy radiation to be used is preferably a UV light.

The peak wavelength of the UV light is, for example, preferably from 200 to 405 nm, more preferably from 250 to 405 nm, and still more preferably from 250 to 390 nm, although a suitable peak wavelength depends on the absorption characteristics of the sensitizing dye that is optionally used as necessary.

The UV light output is preferably 2,000 mJ/cm² or less, more preferably from 10 mJ/cm² to 2,000 mJ/cm², still more preferably from 20 mJ/cm² to 1,000 mJ/cm², and particularly preferably from 50 mJ/cm² to 800 mJ/cm².

In regard to the UV light irradiation, the illuminance on the face to be exposed to the UV light is, for example, from 10 mW/cm² to 2,000 mW/cm², and preferably from 20 mW/cm² to 1,000 mW/cm².

As the UV light source, mercury lamps, gas lasers, solid state lasers and the like are mainly used, and mercury lamps and metal halide lamps are widely known. Replacement with GaN semiconductor ultraviolet emission devices is industrially and environmentally very useful. It is expected that LEDs (light emitting diodes such as UV-LEDs) and LDs (laser diodes such as UV-LDs) become to be used as useful UV light sources since they are compact, and have long life, high efficiency and low cost.

A suitable period for irradiating the ink composition for inkjet recording according to the invention with such a UV light is, for example, from 0.01 seconds to 120 seconds, and more preferably from 0.1 seconds to 90 seconds.

The irradiation conditions and basic irradiation methods are disclosed in JP-A No. 60-132767. Specifically, a method in which light sources are provided at both sides of a head unit that includes an ink ejection device, and the head unit and the light sources are scan-moved in a shuttle manner, or a method in which the irradiation is carried out by a light source which is provided separately from a head unit, and which is not driven to move, are preferable. The irradiation with an active energy radiation is carried out when a certain time (for example, from 0.01 seconds to 60 seconds, more preferably from 0.01 seconds to 30 seconds, and still more preferably from 0.01 seconds to 15 seconds) has passed after ink spotting and thermal fixing.

<Heating and Drying Process>

The ink composition spotted on a recording medium is preferably fixed by evaporating the (Component B) using a heating device. A process of applying heat to the spotted ink composition for inkjet recording according to the invention so as to fix the ink composition is described. This process of drying by heating is herein referred to as "heating and drying process".

The heating device is not particularly limited, and may be any device that can dry the (Component B). The heating may be carried out using, for example, a heat drum, a warm air, an infrared lamp, a heat oven or a heating plate.

The heating temperature is not particularly limited. Effects of the heating can be obtained when the heating temperature is 40° C. or higher, and the heating temperature is preferably from about 40° C. to about 150° C., and more preferably from about 40° C. to about 80° C. In a case in which the temperature exceeds 100° C., the recording medium may deform, and troubles in conveyance of the recording medium may be caused.

The heating/drying time is not particularly limited, and may be appropriately set in consideration of the composition of the ink composition and the print speed.

The solvent-type ink composition for inkjet recording that has been fixed by heating may be further fixed by irradiation with a UV light, as necessary. It is preferable to carry out the fixing by UV light irradiation in order to improve the strength, water fastness and solvent resistance of the printed article.

[Inkjet Printed Article]

The inkjet printed article according to the invention is obtained by recording by the inkjet recording method according to the invention. Since the inkjet printed article according to the invention is obtained by recording by the inkjet recording method according to the invention, the recorded image on the printed article has excellent solvent resistance and excellent adhesiveness to the substrate.

Second Embodiment

A second embodiment according to the invention is described below. In the below description of the second embodiment below, expressions such as "of the invention", "according to the invention" or "in the invention" refers to "of the second embodiment of the invention", "according to the second embodiment of the invention" and "in the second embodiment of the invention", respectively, unless otherwise indicated.

[Ink Composition]

The ink composition according to the invention includes a polymerizable compound, a polymerization initiator and a urethane oligomer or polymer that has a structure represented by following Formula (A) at a side chain thereof

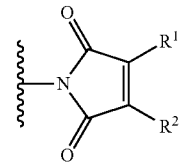

(A)

In Formula (A), $R^1$ and $R^2$ each independently represent a hydrogen atom or an alkyl group, and $R^1$ and $R^2$ may be bonded to each other to form a ring.

The urethane oligomer or polymer has two or more urethane structural units, each of which is represented by [—CONH—R—NHCOO—R'—O—], wherein R represents a divalent group that forms an isocyanate component, and R' represents a divalent group that forms an alcohol component. In other words, the urethane structural units may be formed by a reaction of a divalent isocyanate compound represented by OCN—R—NCO or a higher-valent isocyanate compound with a divalent alcohol represented by HO—R'—OH or a polyhydric alcohol compound. The "urethane oligomer or polymer" refers to a so-called urethane oligomer or a so-called urethane polymer (polyurethane). The urethane oligomer and the urethane polymer are collectively referred to as "urethane compound" or "urethane compounds" hereinafter.

The urethane compound according to the invention is preferably a compound having a weight average molecular weight of from 1,000 to 50,000, more preferably a compound having a weight average molecular weight of from 1,000 to 10,000, and most preferably a compound having a weight average molecular weight of from 1,000 to 5,000.

Weight average molecular weight is measured with a gel permeation chromatograph (GPC). HLC-8220GPC manufactured by Tosoh Corporation, is used as a GPC. Three columns, TSKgel Super HZM-H, TSKgel SuperHZ4000 and TSKgel SuperHZ2000 (all of which are manufactured by Tosoh Corporation, 4.6 mmID (inner diameter)×15 cm), are used for measurement. THF (tetrahydrofuran) is used as an eluent. Regarding the conditions, the sample concentration is 0.35% by mass, the flow rate is 0.35 ml/min, the sample injection amount is 10 μA, and the measurement temperature is 40° C. Detection is performed using an RI (refractive index) detector. A calibration curve is prepared from the following eight samples: standard sample TSK STANDARD POLYSTYRENE, F-40, F-20, F-4, F-1, A-5000, A-2500, A-1000, and n-propylbenzene, all of which are manufactured by Tosoh Corporation.

The term "oligomer" used in relation to the "urethane oligomer" in the invention refers to a compound having a molecular weight of from 1,000 to 5,000, and preferably refers to a compound having a molecular weight of from 1,000 to 4,000. The term "polymer" used in relation to the urethane polymer (polyurethane) in the invention refers to a polymer having a molecular weight of 5,000 or more, and preferably refers to a compound having a molecular weight of from 5,000 to 50,000.

The urethane compound according to the invention is preferably a urethane oligomer.

Applying the ink composition according to the invention onto a recording medium and irradiating the applied ink composition with an active energy radiation results in formation of a cured image. The ink composition according to the invention can be used suitably as, particularly, an ink composition for inkjet recording.

The "active energy radiation" as used in the invention may be, without limitation, any radiation of which irradiation can apply an energy capable of generating an initiating species in the composition. The scope of the active energy radiation includes α rays, β rays, γ rays, X rays, ultraviolet light, visible light, infrared light and electron beams. In particular, ultraviolet light and electron beams are preferable from the viewpoint of curing sensitivity and availability of devices, and ultraviolet light is particularly preferable.

The components of the ink composition according to the invention are described in detail below. In the present specification, an expression "from A to B" refers to a range including A and B as the lower limit value and the upper limit value.

<Urethane Compound Having Structure Represented by Formula (A) at Side Chain>

The ink composition according to the invention includes a urethane compound having a structure represented by following Formula (A) at a side chain thereof.

The presence of a structure represented by following Formula (A) at a side chain promotes curing of the ink composition. The urethane compound having a structure represented by following Formula (A) at a side chain preferably undergoes an addition reaction when irradiated with light.

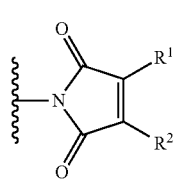

(A)

In Formula (A), $R^1$ and $R^2$ each independently represent a hydrogen atom or an alkyl group, and $R^1$ and $R^2$ may be bonded to each other to form a ring.

In Formula (A), the alkyl group represented by $R^1$ or $R^2$ is preferably an alkyl group having from 1 to 4 carbon atoms, which may have a linear structure or a branched structure. However, the alkyl group represented by $R^1$ or $R^2$ is not limited thereto. Specific examples of the alkyl group include a methyl group, an ethyl group, a propyl group, an isopropyl group, a n-butyl group, an isobutyl group, a s-butyl group and a t-butyl group. The alkyl group represented by $R^1$ or $R^2$ may or may not have a substituent, and preferably does not have a substituent.

$R^1$ and $R^2$ may be bonded to each other to form a 4-membered to 6-membered ring. When $R^1$ and $R^2$ are bonded to each other to form a 4- to 6-membered ring, the ring is preferably a 5-membered ring or a 6-membered ring, and more preferably a 6-membered ring.

$R^1$ and $R^2$ each independently represent preferably a hydrogen atom or an alkyl group having from 1 to 2 carbon atoms, and it is particularly preferable that $R^1$ and $R^2$ represent hydrogen atoms.

When the alkyl group represented by $R^1$ or $R^2$ in Formula (A) has a substituent, the substituent is preferably, for example, an aryl group having from 6 to 20 carbon atoms, an alkoxy group having from 1 to 8 carbon atoms, a hydroxyl group, a carboxyl group, a halogen atom, an alkyloxycarbonyl group having from 2 to 7 carbon atoms, an alkylcarbonyloxy group having from 2 to 7 carbon atoms, an aryloxycarbonyl group having from 7 to 11 carbon atoms, an arylcarbonyloxy group having from 7 to 11 carbon atoms, an alkylcarbamoyl group having from 1 to 7 carbon atoms or an arylcarbamoyl group having from 7 to 11 carbon atoms.

Specific examples of the group represented by Formula (A) include, but are not limited to, the groups shown below.

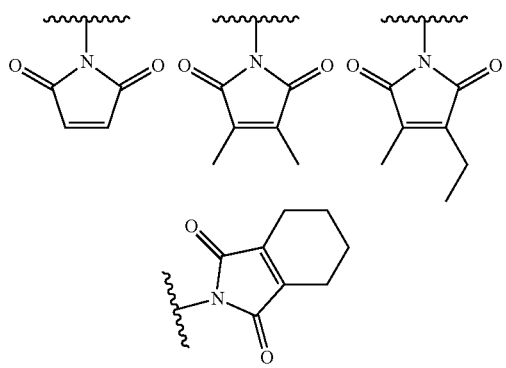

The urethane compound according to the invention has at least one structure represented by Formula (A) at an isocyanate component or an alcohol component or both. The urethane compound according to the invention preferably has a structure represented by Formula (A) at an alcohol component. Here, an alcohol component that has a structure represented by Formula (A) is referred to as "alcohol component (z)". In particular, the urethane compound according to the invention preferably has a repeating unit represented by following Formula (B) as an alcohol component (z).

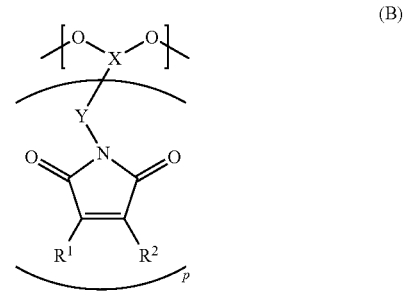

(B)

In Formula (B), $R^1$ and $R^2$ have the same definitions as $R^1$ and $R^2$ in Formula (A), respectively; p represents an integer of from 1 to 3; X represents a linking group having a valency of 2+p; and Y represents a single bond or a divalent linking group.

$R^1$ and $R^2$ in Formula (B) has the same definitions as $R^1$ and $R^2$ in Formula (A), respectively. That is, $R^1$ and $R^2$ each independently represent a hydrogen atom or an alkyl group, and $R^1$ and $R^2$ may be bonded to each other to form a ring. The specifics, including preferable ranges, of $R^1$ and $R^2$ in Formula (B) are the same as the specifics, including preferable ranges, of $R^1$ and $R^2$ in Formula (A).

In Formula (B), p represents an integer of from 1 to 3, and preferably represents 1 or 2.

In Formula (B), X represents a (2+p)-valent linking group. The (2+p)-valent linking group is preferably a linking group having from 2 to 10 carbon atoms. The (2+p)-valent linking group having from 2 to 10 carbon atoms may be, for example, a residue obtained by removing 2+p hydrogen atoms from at least one compound selected from the group consisting of an alkane and a cycloalkane, each of which has from 2 to 10 carbon atoms. The alkane residue as the (2+p)-valent linking group may be linear or branched. Specific examples thereof include, but are not limited to, a residue obtained by removing 2+p hydrogen atoms from an alkane or cycloalkane such as propane, 2-methylpropane, butane, pentane or cyclohexane. X preferably has from 3 to 7 carbon atoms, and most preferably has from 3 to 5 carbon atoms.

In Formula (B), Y represents a single bond or a divalent linking group. The divalent linking group is preferably, for example, an alkylene group having from 1 to 5 carbon atoms. The alkylene group may have a linear structure, a branched structure or a cyclic structure. An ether bond may be interposed between carbon atoms in the alkylene group (to replace a carbon-carbon bond). Specific examples of Y include —$CH_2$—, —$C_2H_4$—, —$C_4H_8$—, —$C_5H_{10}$—, and —$CH_2$—O—$C_2H_4$—.

Specific examples of the repeating unit represented by Formula (B) of the urethane compound according to the invention are shown below. However, the repeating unit represented by Formula (B) in the invention is not limited thereto.

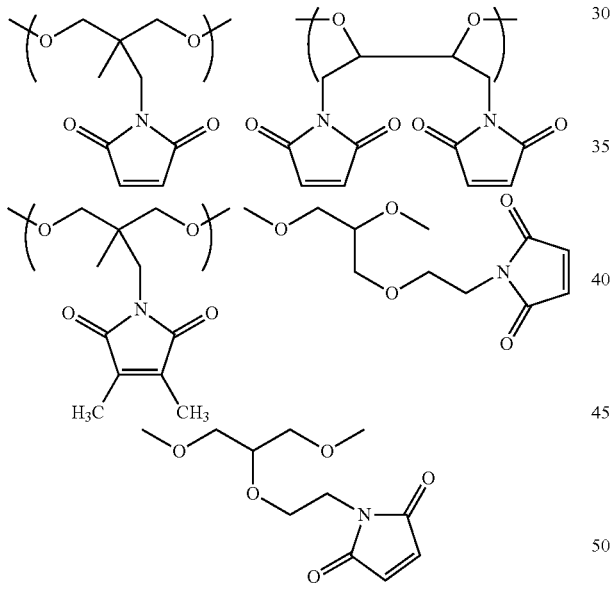

The urethane compound according to the invention may include an alcohol component other than repeating units represented by Formula (B) (hereinafter referred to as "alcohol component (y)"). Specific examples (y-1) to (y-9), which are specific examples of the alcohol component (y) other than repeating units represented by Formula (B), are shown below. However, the alcohol component (y) in the invention is not limited thereto.

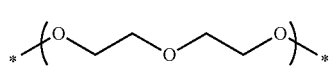
(y-1)

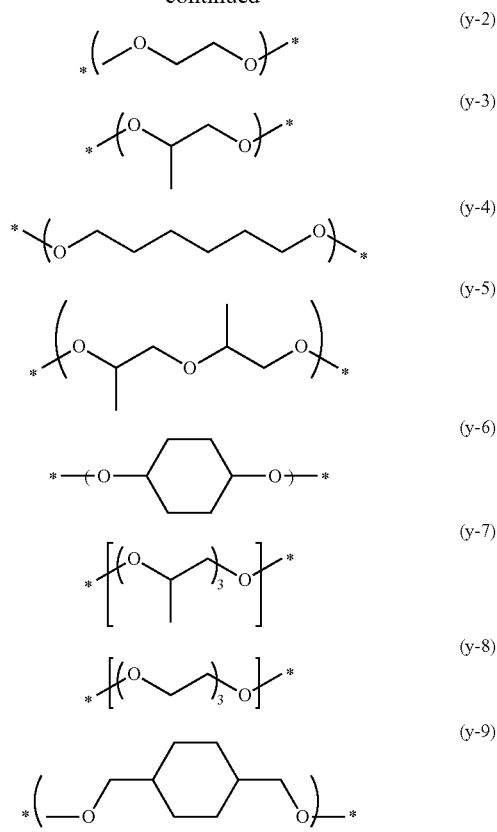

The urethane compound according to the invention includes, in addition to an alcohol component, an isocyanate component, which is hereinafter referred to as "isocyanate component (x)". The urethane compound according to the invention preferably includes a repeating unit represented by following Formula (C) as an isocyanate component (x).

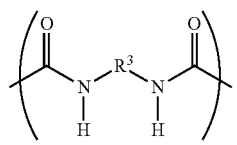
(C)

In Formula (C), $R^3$ represents at least one type of group selected from the group consisting of an alkylene group, a cycloalkylene group, an arylene group and a combination thereof.

The alkylene group represented by $R^3$ in Formula (C) is preferably an alkylene group having from 1 to 20 carbon atoms, more preferably an alkylene group having from 1 to 16 carbon atoms, and still more preferably an alkylene group having from 1 to 12 carbon atoms. The alkylene group may have a linear structure or a branched structure.

In a case in which $R^3$ in Formula (C) has a cycloalkylene group, the ring structure contained in $R^3$ is not limited. The cycloalkylene group may be a cycloalkylene group having from 3 to 10 carbon atoms, such as a cyclopropylene group or a cyclohexylene group. However, the cycloalkylene group represented by $R^3$ is not limited thereto. The cycloalkylene group is preferably a cycloalkylene group having from 3 to 8 carbon atoms, and most preferably a cyclohexylene group.

The arylene group represented by R³ in Formula (C) is preferably an arylene group having from 6 to 15 carbon atoms. However, the arylene group represented by R³ is not limited thereto. Specific examples of the arylene group represented by R³ include a phenylene group, a tolylene group, a naphthalenylene group and biphenylene group.

R³ in Formula (C) may be a combination of at least one alkylene group and at least one cycloalkylene group, a combination of at least one alkylene group and at least one arylene group, a combination of at least one cycloalkylene group and at least one arylene group, or a combination of at least one alkylene group, at least one cycloalkylene group and at least one arylene group. A combination of at least one alkylene group having from 1 to 12 carbon atoms and at least one arylene group having from 6 to 15 carbon atoms, or a combination of at least one cycloalkylene group having from 3 to 16 carbon atoms and at least one alkylene group having from 1 to 12 carbon atoms, are preferable, and a combination of at least one cycloalkylene group having from 3 to 16 carbon atoms and at least one alkylene group having from 1 to 12 carbon atoms is most preferable. The combination of these groups is preferably, but not limited to, a combination of one group of a certain type and one group of another type, such as a combination of one type of cycloalkylene group and one type of alkylene group. Specific examples of a groups composed of two or more of an alkylene group, a cycloalkylene group and an arylene group include a combination of a hexylene group and a cyclohexylene group, a combination of a hexylene group and a tolylene group, and a combination of a tolylene group and a cyclohexylene group.

R³ in Formula (C) may or may not have a substituent, and preferably has a substituent.

When the alkylene group or cycloalkylene group represented by R³ has a substituent, the substituent is preferably an aryl group having from 6 to 20 carbon atoms, an alkoxy group having from 1 to 8 carbon atoms, a hydroxyl group, a carboxyl group, a halogen atom, an alkyloxycarbonyl group having from 2 to 7 carbon atoms, an alkylcarbonyloxy group having from 2 to 7 carbon atoms, an aryloxycarbonyl group having from 7 to 11 carbon atoms, an arylcarbonyloxy group having from 7 to 11 carbon atoms, an alkylcarbamoyl group having from 1 to 7 carbon atoms, or an arylcarbamoyl group having from 7 to 11 carbon atoms, and is most preferably an alkoxy group having from 1 to 8 carbon atoms.

When the arylene group represented by R³ has a substituent, the substituent is preferably an alkyl group having from 1 to 8 carbon atoms, an aryl group having from 6 to 20 carbon atoms, an alkoxy group having from 1 to 8 carbon atoms, a hydroxyl group, a carboxyl group, a halogen atom, an alkyloxycarbonyl group having from 2 to 7 carbon atoms, an alkylcarbonyloxy group having from 2 to 7 carbon atoms, an aryloxycarbonyl group having from 7 to 11 carbon atoms, an arylcarbonyloxy group having from 7 to 11 carbon atoms, an alkylcarbamoyl group having from 1 to 7 carbon atoms, or an arylcarbamoyl group having from 7 to 11 carbon atoms, more preferably an alkyl group having from 1 to 4 carbon atoms, and most preferably an alkyl group having one carbon atom, i.e., a methyl group.

R³ in Formula (C) preferably includes a cycloalkylene group.

Repeating units (Z-1) to (Z-13), which are specific examples of the repeating unit represented by Formula (C) that can be contained in the urethane compound according to the invention, are shown below. However, the repeating unit represented by Formula (C) in the invention is not limited thereto.

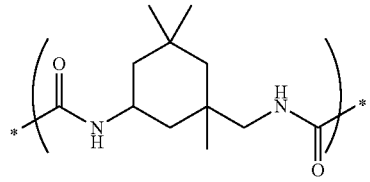
(Z-1)

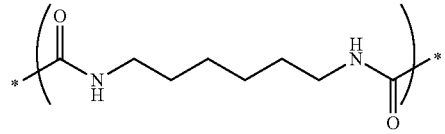
(Z-2)

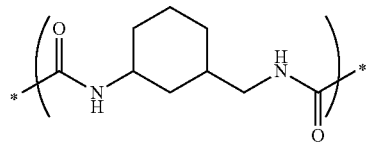
(Z-3)

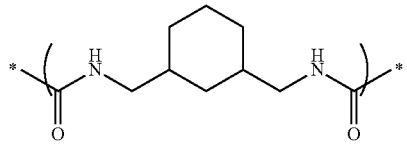
(Z-4)

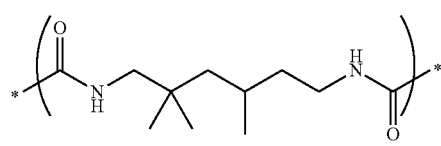
(Z-5)

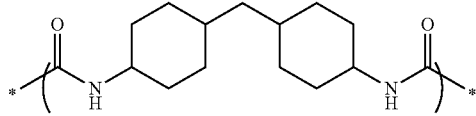
(Z-6)

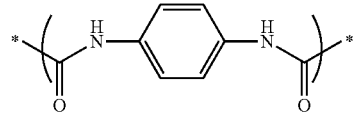
(Z-7)

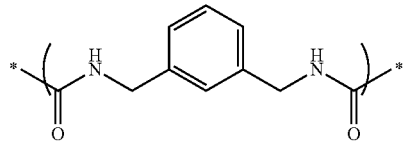
(Z-8)

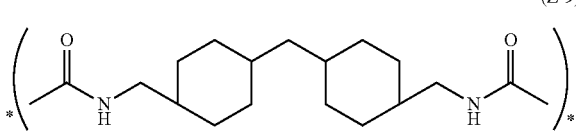
(Z-9)

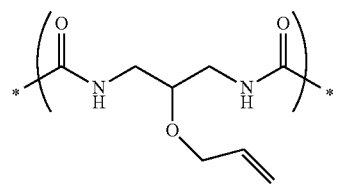
(Z-10)

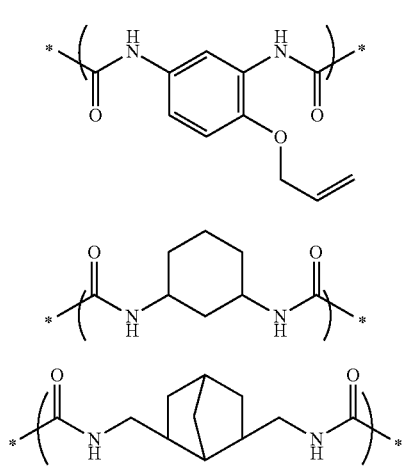

(Z-11)

(Z-12)

(Z-13)

A terminal group of the urethane compound according to the invention may be an alkoxy group, a cycloalkoxy group, an aryloxy group, an alkylamino group or a cycloalkylamino group, and is preferably an alkoxy group, a cycloalkoxy group or an aryloxy group. However, the terminal group is not limited thereto.

The alkoxy group as an example of a terminal group of the urethane compound may be an alkoxy group having from 1 to 8 carbon atoms, and may have a linear structure or a branched structure. However, the alkoxy group is not limited thereto. Specific examples of the alkoxy group include a methoxy group, an ethoxy group, a propyloxy group, an isopropyloxy group and a butoxy group.

The cycloalkoxy group as an example of a terminal group of the urethane compound may be a cycloalkoxy group having from 1 to 10 carbon atoms. However, the cycloalkoxy group is not limited thereto. Examples of the cycloalkoxy group include a cyclohexyloxy group, a cyclopentyloxy group and a cyclohexylmethoxy group.

The aryloxy group as an example of a terminal group of the urethane compound may be an aryloxy group having from 6 to 10 carbon atoms. However, the aryloxy group is not limited thereto. Specific examples the aryloxy group include a phenoxy group and a p-methylphoenoxy group.

The alkylamino group as an example of a terminal group of the urethane compound may be an alkylamino group having from 1 to 8 carbon atoms, and may have a linear structure or a branched structure. However, the alkylamino group is not limited thereto. Specific examples of the alkylamino group include a methylamino group, a dimethylamino group, an ethylamino group, a propylamino group, an isopropylamino group, a morpholino group, and a piperidino group.

The cycloalkylamino group as an example of a terminal group of the urethane compound may be a cycloalkylamino group having from 1 to 10 carbon atoms. However, the cycloalkylamino group is not limited thereto. Examples of the cycloalkylamino group include a cyclohexylamino group, a cyclopentylamino group and a cyclohexylmethylamino group.

The urethane compound according to the invention may be a three-component urethane compound obtained by copolymerization of at least one isocyanate component (x), at least one alcohol component (z) having a repeating unit represented by the Formula (B) above and at least one alcohol component (y), which is an alcohol component other than repeating units represented by the Formula (B) above, or a two-component urethane compound obtained by copolymerization of at least one isocyanate component (x) and at least one alcohol component (z). The urethane compound according to the invention is preferably the three-component urethane compound.

Let assume that the copolymerization ratio of isocyanate component (x) in the urethane compound according to the invention is represented by x, the copolymerization ratio of alcohol component (y) other than repeating units represented by the Formula (B) above in the urethane compound is represented by y, and the copolymerization ratio of alcohol component (z) having a repeating unit represented by the Formula (B) above in the urethane compound is represented by z. With respect to the copolymerization ratios, in a case in which the urethane compound according to the invention is a three-component urethane compound, the total sum of x, y and z is 100. In a case in which the urethane compound according to the invention is a two-component urethane compound, the total sum of x and either one of y or z is 100. Here, x, y and z represents copolymerization ratios by mol.

In the urethane compound according to the invention, the copolymerization ratio represented by x is preferably in the range of $20 \leq x \leq 80$, and more preferably in the range of $30 \leq x \leq 70$.

In the urethane compound according to the invention, the copolymerization ratio represented by y is preferably in the range of $0 \leq y \leq 45$, and more preferably in the range of $10 \leq y \leq 40$.

In the urethane compound according to the invention, the copolymerization ratio represented by z is preferably in the range of $5 \leq z \leq 50$, and more preferably in the range of $10 \leq z \leq 40$.

Urethane compounds (Ur-1) to (Ur-7), which are specific examples of urethane compound according to the invention, are shown below. However, the urethane compound according to the invention is not limited thereto.

| Exemplary Compound | Isocyanate Component (x) | Isocyanate Component (x') | Alcohol Component (y) |
|---|---|---|---|
| (Ur-1) | ![structure] | — | ![structure] |

-continued
| | | | |
|---|---|---|---|
| (Ur-2) | 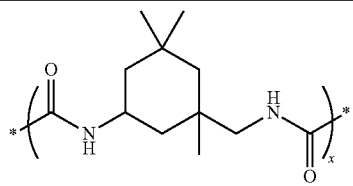 | — | 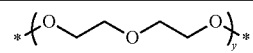 |
| (Ur-3) | 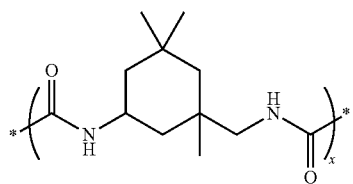 | — | 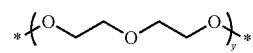 |
| (Ur-4) | 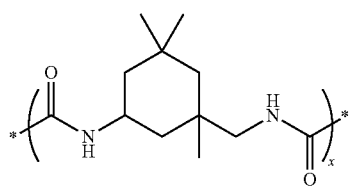 | — | 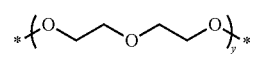 |
| (Ur-5) | 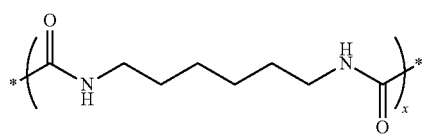 | — | 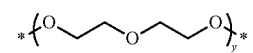 |
| (Ur-6) | 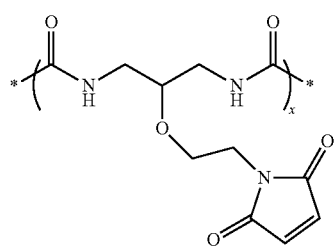 | 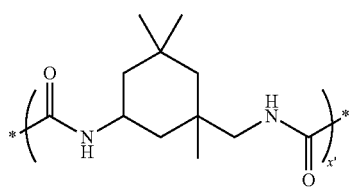 | 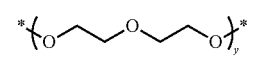 |
| (Ur-7) | 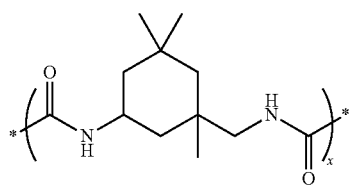 | — | — |
| Exemplary Compound | Alcohol Component (z) | x:y:z | Weight Average Molecular Weight |
|---|---|---|---|
| (Ur-1) | | 50:30:20 | 3,000 |
| (Ur-2) | | 50:30:20 | 3,300 |

| | | | |
|---|---|---|---|
| (Ur-3) | 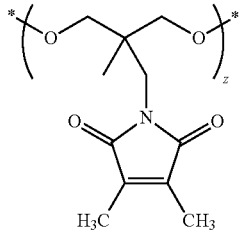 | 50:30:20 | 3,200 |
| (Ur-4) | 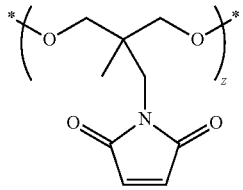 | 50:30:20 | 12,000 |
| (Ur-5) | 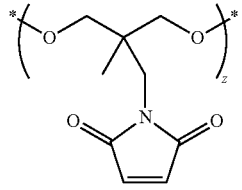 | 50:30:20 | 2,800 |
| (Ur-6) | 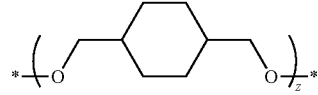 | x:x':y:z<br>20:30:30:20 | 3,400 |
| (Ur-7) | 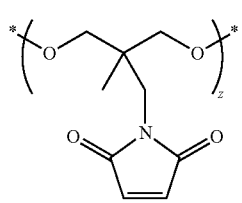 | 50:0:50 | 2,900 |

Urethane compounds (Ur-1) to (Ur-7) are preferable for use as urethane compounds in the invention, and (Ur-1) and (Ur-2) are particularly preferable.

A raw material which is used in the synthesis of the urethane compound in the invention, and which corresponds to an isocyanate component (x) may be selected from various commercially available isocyanates, such as isophorone diisocyanate (such as a product manufactured by Tokyo Chemical Industry Co., Ltd.) and hexamethylene diisocyanate (such as a product manufactured by Tokyo Chemical Industry Co., Ltd.).

A raw material which is used in the synthesis of the urethane compound in the invention, and which corresponds to an alcohol component (y) may be selected from various commercially available diols, such as diethyleneglycol (such as a product manufactured by Wako Pure Chemical Industries, Ltd.) and hexanediol (such as a product manufactured by Wako Pure Chemical Industries, Ltd.).

A raw material which is used in the synthesis of the urethane compound in the invention, and which corresponds to an alcohol component (z) may be, for example, a diol having a maleimide group described in *Tetrahedron*, vol. 58, page 7049 (2002).

Urethane compounds, such as urethane compounds (Ur-1) to (Ur-7), can be obtained with reference to *J. Polym. Sci.*, vol. 45, 49 (1960) and JP-A No. 2006-45362.

In the invention, an earnest study was made on ink compositions suitable for inkjet recording; as a result, it was found that the ejection properties of the ink composition, the curing sensitivity of the ink composition against irradiation with an active energy radiation, the adhesiveness of the formed image and the resistance of the formed image against blocking can be improved by using a urethane compound having a structure represented by the above Formulae (A) at a side chain, a polymerizable compound and a polymerization initiator. Although the mechanism of the improvement has not become clear, it is presumed that since the structure represented by Formulae (A) functions as a radical reactive group having an appropriate degree of reactivity, the urethane compound according to the invention is distributed at a relatively high density at an interface between the ink composition and the substrate of a recording medium, thereby efficiently exhibiting adhesiveness. It is further presumed that, since the urethane compound efficiently exhibit adhesiveness, the content of the urethane compound relative to the entire amount of the ink composition can be set to be small, as a result of which ejection properties and curing sensitivity, which could be unsatisfactory when urethane compounds other than the urethane compound according to the invention are added, can be improved. However, the invention is not limited to the presumed mechanism described above.

The content of the urethane compound according to the invention is preferably from 0.5 to 5.0% by mass, more preferably from 0.5 to 3.0% by mass, and most preferably from 1.0 to 3.0% by mass, relative to the entire amount of the ink composition. A content of the urethane compound according to the invention of 0.5% by mass or higher is preferable from the viewpoint of adhesiveness. A content of the urethane compound according to the invention of 5.0% by mass or lower is preferable from the viewpoint of ejection properties.

<Polymerizable Compound (Other Polymerizable Compound)>

The ink composition according to the invention includes, in addition to the urethane compound, a polymerizable compound other than urethane compounds having a structure represented by the Formula (A) above, which is hereinafter sometimes referred to as "other polymerizable compound" or "additional polymerizable compound".

The polymerizable compound in the invention may be a radical-polymerizable compound or a cation-polymerizable compound, and is preferably a radical-polymerizable compound.

In the following, radical-polymerizable compounds from among additional polymerizable compounds that can be used in the invention are further described.

A radical polymerizable compound is a compound that has a radical-polymerizable ethylenic unsaturated bond, and may be any compound that has at least one radical-polymerizable ethylenic unsaturated bond in a molecule thereof. The radical-polymerizable compound may be in a chemical form of monomer, oligomer, polymer or the like. The radical-polymerizable compound may be used singly, or in combination of two or more thereof at any ratio, in order to improve the desired properties. Use of two or more radical-polymerizable compounds is preferable in terms of controlling properties such as reactivity and physical characteristics.

Examples of polymerizable compounds having an ethylenic unsaturated bond include unsaturated carboxylic acids, such as acrylic acid, methacrylic acid, itaconic acid, crotonic acid, isocrotonic acid and maleic acid, and salts thereof; unsaturated carboxylic acid esters; unsaturated carboxylic acid amides; anhydrides having an ethylenic unsaturated bond; acrylonitrile; styrene; and other radical-polymerizable compounds such as various unsaturated polyesters, unsaturated polyethers and unsaturated polyamides. Unsaturated carboxylic acids, unsaturated carboxylic acid esters and salts thereof are preferable for use.

Specific examples thereof include:

acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, phenoxyethyl acrylate, propoxylated neopenthylglycol diacrylate, ethyleneglycol diacrylate, diethyleneglycol diacrylate, triethyleneglycol diacrylate, tetraethyleneglycol diacrylate, polyethyleneglycol diacrylate, dipropyleneglycol diacrylate, polypropyleneglycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylolacrylamide, diacetone acrylamide, epoxy acrylate, cyclic trimethylolpropane formal acrylate (CTFA), tetrahydrofurfuryl acrylate (THFA);

methacrylic derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethyleneglycol dimethacrylate, triethyleneglycol dimethacrylate, polyethyleneglycol dimethacrylate, polypropyleneglycol dimethacrylate, trimethylolethane trimethacrylate, trimethylolpropane trimethacrylate, 2,2-bis(4-methacryloxypolyethoxyphenyl) propane;

allyl compound derivatives such as allyl glycidyl ether, diallyl phthalate and triallyl trimellitate; and N-vinyl compounds such as N-vinyl-ε-caprolactam.

More specific examples include commercially available products and radical-polymerizable or radical-crosslinking monomers, oligomers and polymers known in the art, such as those described in Shinzo Yamashita ed., *Kakyo-zai Handbook* (Crosslinking Agent Handbook) (Taiseisha Ltd., 1981), Seishi Kato ed., *UV•EB Curing Handbook: Genryo-hen* (UV•EB Curing Handbook: Raw Materials) (*Kobunshi-kanko-kai*, 1985), Japanese Research Association for Surface Finishing by UV, EB, Laser ed., *UV•EB Kouka-gijutsu-no Ouyou-to-Shijo* (Applications and Markets of UV•EB curing techniques), page 79 (CMC Publishing Co., Ltd., 1989), and Eiichiro Takiyama, *Polyester Jushi Handbood* (Polyester Resin Handbook) (The Nikkan Kogyo Shinbun Ltd., 1988). From among them, cyclic trimethylolpropane formal acrylate (CTFA) is particularly preferable.

Examples of radical-polymerizable compounds include photocurable polymerizable compounds for use in photopolymerizable compositions described in, for example, JP-A No. 7-159983, Japanese Examined Patent Application Publication No. 7-31399, JP-A No. 8-224982, JP-A No. 10-863, and JP-A No. 9-134011.

In order to improve sensitivity and adhesiveness to a recording medium and to mitigate bleeding, it is preferable to use, as radical-polymerizable compounds, a monoacrylate and a polyfunctional acrylate monomer or oligomer which has a molecular weight of 400 or more, more preferably 500 or more. In particular, in the case of an ink composition used for recording on a flexible recording medium such as a PET (polyethylene terephthalate) film or a PP (polypropylene) film, a combined use of a monoacrylate selected from the above groups of compounds and a polyfunctional acrylate monomer or a polyfunctional acrylate oligomer is preferable from the viewpoint of achieving improvement of adhesiveness of a film formed from the ink composition by imparting flexibility to the film, as well as achieving an increase in the strength of the film.

Further, combined use of at least two polymerizable compounds, including a monofunctional monomer and a polyfunctional monomer that is bi- or higher-functional, is preferable from the viewpoints of ensuring safety, further improving sensitivity and adhesiveness to a recording medium, and further mitigating bleed.

From among monoacrylates, phenoxyethyl acrylate, stearyl acrylate, isoamyl acrylate, isomyristyl acrylate, isostearyl acrylate, 2-hydroxy-3-phenoxypropyl acrylate, isobornyl acrylate, isooctyl acrylate, propoxyethyl acrylate and 2-(2-ethoxyethoxy)ethyl acrylate have high sensitivity, and a film formed therefrom exhibits low shrinkage, whereby curling can be prevented. These specific monoacrylates are preferred also from the viewpoints of bleed prevention, alleviation of the odor of printed articles and reduction of the cost of the irradiation apparatus.

An oligomer that can be used together with a monoacrylate is particularly preferably epoxy acrylate oligomer.

In the invention, the additional polymerizable compound is preferably selected from the acrylates compounds described above. The proportion of the acrylate compounds is preferably from 30% by mass or higher, more preferably 40% by mass or higher, and still more preferably 50% by mass or hither, relative to the total mass of additional polymerizable compounds. In an embodiment, all of the additional polymerizable compounds are selected from the acrylate compounds described above.

In the ink composition according to the invention, the total of the content of polymerizable compounds other than urethane oligomers or polymers having a structure represented by the above Formula (A) (hereinafter, also refer to additional polymerizable compounds) and the content of urethane oligomers or polymers having a structure represented by the Formula (A) above is preferably 60% by mass or more, more preferably from 60% by mass to 95% by mass, and most preferably from 65% by mass to 90% by mass, relative to the entire amount of the ink composition according to the invention, from the viewpoints of the properties and curing sensitivity of the ink composition.

The content of additional polymerizable compounds that can be included in the ink composition in addition to the urethane compound according to the invention is preferably from 55% by mass to 90% by mass, and more preferably from 60% by mass to 85% by mass, relative to the total mass of polymerizable compounds in the invention.

The molecular weight of additional polymerizable compound in the invention is preferably from 130 to 3,000, and more preferably from 130 to 500, in terms of weight average molecular weight.

<Polymerization Initiator>

The ink composition according to the invention includes a polymerization initiator.

The polymerization initiator in the invention is preferably a photopolymerization initiator. The photopolymerization initiator to be used may be selected, as appropriate, from known photopolymerization initiators, in accordance with the type of polymerizable compound and the purpose of the use of the ink composition.

The photopolymerization initiator for use in the ink composition according to the invention is a compound that generates a radical, which is a polymerization initiating species, by absorbing an active energy radiation (light). The active energy radiation (light) may be, without particular limitation, any radiation that can apply energy capable of generating an initiating species. The scope of the active energy radiation (light) widely encompasses α-rays, β-rays, γ-rays, X-rays, ultraviolet light, visible light, infrared light and electron beams. From among them, ultraviolet light and electron beams are preferable, and ultraviolet light is particularly preferable, from the viewpoints of curing sensitivity and the availability of the apparatus.

The photopolymerization initiator to be used may be a known compound. Preferable photopolymerization initiators for used in the invention include: (a) an aromatic ketone; (b) an acylphosphine oxide compound; (c) an aromatic onium salt compound; (d) an organic peroxide; (e) a thio compound; (f) a hexaaryl biimidazole compound; (g) a ketoxime ester compound; (h) a borate compound; (i) an azinium compound; (j) a metallocene compound; (k) an active ester compound; (l) a compound having a carbon-halogen bond; and (m) an alkylamine compound.

The photopolymerization initiator to be used may be one compound selected from the above compounds (a) to (m), or a combination of compounds selected from the above compounds (a) to (m). In the invention, use of a single photopolymerization initiator, and combined use of two or more photopolymerization initiators, are both suitable in the invention.

Preferable examples of (a) an aromatic ketone, (b) an acylphosphine oxide compound and (e) a thio compound include compounds having a benzophenone skeleton or a thioxanthone skeleton described in J. P. FOUASSIER and J. F. RABEK, *RADIATION CURING IN POLYMER SCIENCE AND TECHNOLOGY*, pp. 77~117 (1993). More preferable examples include α-thiobenzophenone compounds described in JP-B No. 47-6416, benzoin ether compounds described in JP-B No. 47-3981, α-substituted benzoin compounds described in JP-B No. 47-22326, benzoin derivatives described in JP-B No. 47-23664, aroylphosphonic acid esters described in JP-A No. 57-30704, dialkoxybenzophenones described in JP-B No. 60-26483, benzoin ether compounds described in JP-B No. 60-26403 and JP-A No. 62-81345, α-aminobenzophenone compounds described in JP-B No. 1-34242, U.S. Pat. No. 4,318,791 and European Patent Application Publication No. 0284561A1, p-di(dimethylaminobenzoyl)benzene described in JP-A No. 2-211452, thio-substituted aromatic ketones described in JP-A No. 61-194062, acylphosphine sulfides described in JP-B No. 2-9597, acylphosphines described in JP-B No. 2-9596, thioxanthones described in JP-B No. 63-61950, coumarines described in JP-B No. 59-42864. Further, polymerization initiators described in JP-A No. 2008-105379 and JP-A No. 2009-114290 are also preferable.

From among these, use of an aromatic ketone or an acylphosphine oxide compound as a photopolymerization initiator is preferred in the invention. Specifically, preferable examples thereof include p-phenylbenzophenone (such as a product manufactured by Wako Pure Chemical Industries, Ltd.), bis(2,4,6-trimethylbenzoyl)-phenylphosphine oxide (such as IRGACURE 819 (tradename, manufactured by BASF Japan Ltd.)), bis(2,6-dimethoxybenzoyl)-2,4,4-trimethyl-pentylphenylphosphine oxide, 2,4,6-trimethylbenzoyl-diphenyl-phosphine oxide (such as DAROCUR TPO (tradename, manufactured by BASF Japan Ltd.), and LUCIRIN TPO (tradename, manufactured by BASF Japan Ltd.)).

The polymerization initiator may be used singly, or in combination of two or more thereof.

The content of polymerization initiator in the ink composition is preferably in the range of from 0.1 to 15% by mass.

The content ratio of radical polymerization initiator relative to the sensitizing dye described below that may be used as necessary is preferably such that the mass ratio of polymerization initiator to sensitizing dye (polymerization initiator: sensitizing dye) is within the range of from 200:1 to 1:200, more preferably 50:1 to 1:50, and still more preferably from 20:1 to 1:5.

<Coloring Agent>

It is not essential for the ink composition according to the invention to be used for forming a colored image. However, when the ink composition is used for forming a colored image, the ink composition may include a coloring agent.

Coloring agents that can be used in the invention are not particularly limited. The coloring agent to be used may be selected from any known coloring agents such as pigments, oil-soluble dyes, water-soluble dyes, and disperse dyes. Among them, the coloring agent is preferably selected form pigment and oil-soluble dyes, which have excellent weather resistance and excellent color reproducibility, and the coloring agent is more preferably a pigment.

From the viewpoint of prevent the sensitivity of the curing reaction by an active energy radiation from being lowered, a coloring agent that can suitably be used in the ink composition according to the invention is preferably a compound that does not function as a polymerization inhibitor during a polymerization reaction, which is a curing reaction.

—Pigment—

Pigments that can be used in the invention are not particularly limited, and the organic or inorganic pigments having the following numbers described in the Color Index may be used.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, Pigment Orange 13, 16, 20, and 36.

Examples of blue or cyan pigments include Pigment Blue 1, 15, 15:1, 15:2, 15:3, 15:4, 15:6, 16, 17-1, 22, 27, 28, 29, 36, and 60.

Examples of green pigments include Pigment Green 7, 26, 36, and 50.

Examples of yellow pigments include Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, and 193. Pigment Yellow 120, 155, and 180 are preferable.

Examples of black pigments include Pigment Black 7, 28 and 26.

Examples of white pigments include Pigment White 6, 18, and 21.

The coloring agent to be used may be appropriately selected from these pigments, in accordance with the purpose.

—Oil-soluble Dye—

Oil-soluble dyes that can be used in the invention are described below.

From among oil-soluble dyes that can be used in the invention, any yellow oil-soluble dyes can be used as yellow dyes. Examples of yellow oil-soluble dyes include: aryl- or heteryl-azo dyes having a coupling component selected from, for example, phenols, naphthols, anilines, pyrazolones, pyridones, and open-chain active methylene compounds; azo methine dyes having a coupling component that may be selected from open-chain active methylene compounds; methine dyes such as benzylidene dyes and monomethine oxonol dyes; and quinoene dyes such as naphthoquinone dyes and anthraquinone dyes, and further include quinophthalone dyes, nitro/nitroso dyes, acridine dyes and acridinone dyes.

From among oil-soluble dyes that can be used in the invention, any magenta oil-soluble dyes can be used as magenta dyes. Examples of magenta oil-soluble dyes include: aryl- or heteryl-azo dyes having a coupling component selected from, for example, phenols, naphthols and anilines; azo methine dyes having a coupling component selected from pyrazolones and pyrazolotriazoles; methine dyes such as arylidene dyes, styryl dyes, merocyanine dyes and oxonol dyes; carbonium dyes such as diphenylmethane dyes, triphenylmethane dyes and xanthene dyes; quinone dyes such as naphthoquinone, anthraquinone and anthrapyridone; and condensed polycyclic dyes such as dioxazine dyes.

From among oil-soluble dyes that can be used in the invention, any cyan oil-soluble dyes can be used as cyan dyes. Examples of cyan oil-soluble dyes include: indoaniline dyes, indophenol dyes, and azomethine dyes having a coupling component selected from pyrrolotriazoles; polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; aryl- or heteryl-azo dyes having a coupling component selected from, for example, phenols, naphthols and anilines; and indigo/thioindigo dyes.

The dyes described above each may be a compound that becomes to assume a color of yellow, magenta or cyan only after dissociation of a part of its chromophore (chromogenic atomic group). In this case, the counter-cation may be an inorganic cation such as an alkali metal or ammonium, or an organic cation such as pyridinium or a quaternary ammonium salt, or a polymer cation that includes a cation, such as those described above, in its structure.

Preferable specific examples of oil-soluble dyes include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2.

From among these, NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (tradenames, manufactured by Orient Chemical Industries Co., Ltd.), AIZEN SPILON BLUE GNH (tradenames, manufactured by Hodogaya Chemical Co., LTD.), NEOPEN YELLOW 075, NEOPEN MAZENTA SE1378, NEOPEN BLUE 808, NEOPEN BLUE FF4012, and NEOPEN CYAN FF4238 (tradenames, manufactured by BASF Japan Ltd.) are particularly preferable.

—Disperse Dyes—

In the invention, it is also possible to use a disperse dye as long as the disperse dye dissolves in a water-immiscible organic solvent. The scope of disperse dyes generally includes water-soluble dyes. However, in the invention, the disperse dye is preferably used in a range in which the disperse dye dissolves in a water-immiscible organic solvent.

Preferable specific examples of disperse dyes include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

The coloring agent for use in the invention is preferably subjected to dispersing treatment after the coloring agent is added to the ink composition according to the invention, such that the coloring agent is dispersed in the ink composition to an appropriate degree. The dispersing of the coloring agent can be carried out using a disperser such as a ball mill, a sand mill, an Attritor, a roll mill, an agitator, a Henschel mixer, a colloid mill, a ultrasonic homogenizer, a pearl mill, a wet-type jet mill, and a paint shaker.

In the case of dispersing the coloring agent, a dispersant may be added to form a dispersion (mill base). The dispersant is not particularly limited in terms of the type thereof, and the dispersant is preferably a polymeric dispersant. Examples of polymeric dispersants include SOLSPERSE series products produced by Noveon Inc. Synergists suitable for the respective pigments may be used as dispersion aids. In the invention, the content of dispersants and dispersion aids is preferably from 1 to 50 parts by mass relative to 100 parts by mass of coloring agent.

When preparing the ink composition according to the invention, the coloring agent may be directly added together with other components. Alternatively, in order to improve the dispersibility of the coloring agent, the coloring agent may be added to a dispersion medium, such as a solvent or a polymerizable compound, and uniformly dispersed or dissolved, and thereafter blended with other components.

One type of, or two or more types of, coloring agent may be appropriately selected for use, in accordance with the purpose of the use of the ink composition.

In a case in which a coloring agent that remains in the solid state when contained in the ink composition according to the invention, such as a pigment, is used, selection of the coloring agent, the dispersant and the dispersion medium and the setting of the dispersion conditions and the filtration conditions are preferably carried out such that the average particle diameter of the pigment particles would be preferably from 0.005 to 0.5 µm, more preferably from 0.01 to 0.45 µm, and still more preferably from 0.015 to 0.4 µm. The control of the particle diameter in this manner is preferable since the control of the particle diameter suppresses clogging of the head nozzle, and allows the storage stability, transparency and curing sensitivity of the ink composition to be maintained.

The content of coloring agent in the ink composition according to the invention may be suitably selected in accordance with the purpose of the use of the ink composition. In consideration of the physical properties and coloring properties of the ink composition, it is generally preferable that the content of coloring agent is from 0.5 to 10% by mass relative to the entire mass of the ink composition.

In a case in which the ink composition according to the invention is a white ink composition containing a white pigment such as titanium oxide as a coloring agent, the content of coloring agent in the ink composition is preferably from 5 to 30% by mass, and more preferably from 10 to 25% by mass, relative to the entire mass of the ink composition, in order to ensure that sufficient light-shielding properties are obtained.

<Water>

From the viewpoint of productivity and prevention of bleed, the ink composition according to the invention is preferably a non-aqueous ink composition that does not substantially include water. Specifically, the content of water is preferably 5% by mass or less, and more preferably 1% by mass, relative to the entire amount of the ink composition.

<Sensitizing Dye>

A sensitizing dye may be added to the ink composition according to the invention in order to promote the decomposition of the polymerization initiator by irradiation with an active energy radiation. The sensitizing dye gets into an electronically-excited state by absorbing a specific active energy radiation. When the electronically-excited sensitizing dye contacts the polymerization initiator, the sensitizing dye exerts an effect such as electron transfer, energy transfer or heat generation, thereby promoting a chemical change of the polymerization initiator, i.e., decomposition and radical generation.

The sensitizing dye to be used may be a compound suitable for the wavelength of the active energy radiation that causes a radical polymerization initiator used in the ink composition to generate an initiating species. In a case in which the sensitizing dye is used for a curing reaction of a general ink composition, examples of preferable sensitizing dyes include sensitizing dyes which belong to the following classes of compounds, and which have an absorption wavelength in the wavelength range of from 350 nm to 450 nm, and that belong to the following classes of compounds:

polynuclear aromatic compounds (such as anthracene, pyrene, perylene and triphenylene), thioxanthones (such as isopropylthioxanthone), xanthenes (such as fluorescein, eosine, erythrosine, rhodamine B and rose bengal), cyanines (such as thiacarbocyanine and oxacarbocyanine), merocyanines (such as merocyanine and carbomerocyanine), thiazines (such as thionine, methylene blue and toluidine blue), acridines (such as acridine orange, chloroflavin and acriflavin), anthraquinones (such as anthraquinone), squaryliums (such as squarylium) and coumarines (such as 7-diethylamino-4-methylcoumarine).

Polynuclear aromatic compounds and thioxanthones are preferable classes of compounds, and thioxanthones are more preferable, and isopropylthioxanthone is most preferable.

<Cosensitizer>

The ink composition according to the invention may further include a cosensitizer. In the invention, the cosensitizer exerts effects such as further improvement of the sensitivity of the sensitizing dye against an active energy radiation or suppression of polymerization inhibitory effects of oxygen on the polymerizable compound.

Examples of the cosensitizer include amines such as the compounds described in M. R. Sander et al., *Journal of Polymer Science*, vol. 10, page 3173 (1972), Japanese Examined Patent Application Publication (JP-B) No. 44-20189, JP-A No. 51-82102, JP-A No. 52-134692, JP-A No. 59-138205, JP-A No. 60-84305, JP-A No. 62-18537, JP-A No. 64-33104, and Research Disclosure 33825. Specific examples thereof include triethanolamine, ethyl p-dimethylaminobenzoate, p-formyldimethylaniline and p-methylthiodimethylaniline.

Other examples of the cosensitizer include thiols and sulfides, such as thiol compounds described in JP-A No. 53-702, JP-B No. 55-500806, and JP-A No. 5-142772, and disulfide compounds described in JP-A No. 56-75643. Specific examples thereof include 2-mercaptobenzothiazole, 2-mercaptobenzoxazol, 2-mercaptobenzimidazole, 2-mercapto-4 (3H)-quinazoline and β-mercaptonaphthalene.

Still other examples of the cosensitizer include amino acid compounds (such as N-phenylglycine), organic metal compounds described in JP-B No. 48-42965 (such as tributyltin acetate), hydrogen donors described in JP-B No. 55-34414, sulfur compounds described in JP-A No. 6-308727 (such as trithiane), phosphorus compounds described in JP-A No. 6-250387 (such as diethylphosphite), and Si—H compounds and Ge—H compounds.

<Other Components>

The ink composition for inkjet recording according to the invention may further include one or more other components, as necessary. Examples of other components include a polymerization inhibitor and a solvent.

The polymerization initiator is added with a view to improving the storage stability. The ink composition according to the invention is preferably ejected after being heated to a temperature within the range of from 40° C. to 80° C. for viscosity reduction. Therefore, the addition of a polymerization inhibitor is preferable also from the viewpoint of preventing head clogging due to thermal polymerization. The polymerization inhibitor may be added to the ink composition according to the invention such that the content of polymerization inhibitor in the ink composition is preferably from 200 to 20,000 ppm relative to the entire amount of the ink composition. Examples of the polymerization inhibitor include hydroquinone, benzoquinone, p-methoxyphenol.

It is preferable that the ink composition according to the invention does not include a solvent, so that the ink composition can quickly react and cure directly after spotting of the ink composition. However, a predetermined solvent may be included in the ink composition as long as the curing speed and the like of the ink composition are not affected. In the invention, the solvent may be an organic solvent and/or water. In particular, an organic solvent may be added in order to improve the adhesiveness of the ink composition to a recording medium (more specifically, a support such as paper). Examples of solvents that can be suitably used include propylene carbonate, dimethyl succinate, dimethyl glutarate and dimethyl adipate, and mixtures thereof.

The amount of organic solvent is preferably from 0 to 5% by mass, and more preferably from 0.1 to 3% by mass, relative to the entire mass of the ink composition according to the invention.

Besides the above, known compounds may be incorporated into the ink composition according to the invention, as necessary. For example, compounds to be incorporated into the ink composition may be appropriately selected from surfactants, leveling additives, matte agents, polyester resins for controlling film properties, rubber resins and waxes. Further, it is also preferable for the ink composition to include a tackifier that does not inhibit polymerization, in order to improve adhesiveness to a recording medium such as polyolefine or PET. Specific examples of the tackifier include high-molecular tacky polymers described in pages 5 to 6 of JP-A No. 2001-49200 (such as a copolymer composed of an ester of (meth)acrylic acid and an alcohol having an alkyl group having from 1 to 20 carbon atoms, an ester of (meth)acrylic acid and alicyclic alcohol having from 3 to 14 carbon atoms and an ester of (meth)acrylic acid and an aromatic alcohol having from 6 to 14 carbon atoms), and low-molecular tackiness-imparting resins having a polymerizable unsaturated bond.

[Properties of Ink Composition]

The ink composition according to the invention preferably has an active-energy-curability. The manner of image formation using the ink composition is not particularly limited, and the ink composition can be applied to general coating methods, transfer methods and inkjet recording methods. In a preferable embodiment of the invention, the proportion of polymerizable compound to the entire ink composition is 60% by mass or higher, which means that the content of low-molecular compounds is high. Therefore, in this embodiment, the ink composition can suitably be used for inkjet recording, from the viewpoint of viscosity.

In the following, properties of the ink composition according to the invention that are preferred in a case in which the ink composition is used for inkjet recording are described.

In consideration of ejection stability, the viscosity of the ink composition according to the invention at an ejection temperature (for example, from 25° C. to 60° C., and more preferably from 25° C. to 50° C.) is preferably from 5 to 30 mPa·s, and more preferably from 7 to 25 mPa·s. For example, the viscosity of the ink composition according to the invention at room temperature (from 25° C. to 30° C.) is preferably from 10 to 50 mPa·s, and more preferably from 12 to 40 mPa·s.

The compositional ratios of the components of the ink composition according to the invention is preferably appropriately adjusted such that the viscosity of the ink composition is within the range described above. By setting the viscosity of the ink composition at room temperature to be high, ink penetration into a recording medium can be prevented even in a case in which a porous recording medium is used, and the amount of uncured monomers and odor can be reduced. Further, ink bleeding upon spotting of ink droplets can be suppressed, as a result of which image quality can be improved.

The surface tension of the ink composition according to the invention is preferably from 20 to 30 mN/m, and more preferably from 23 to 28 mN/m. In the case of recording on various recording media such as polyolefine, PET, coated paper and non-coated paper, the surface tension of the ink composition according to the invention is preferably 20 mN/m or higher from the viewpoint of prevention of bleed and penetration, and is preferably 30 mN/m or lower from the viewpoint of wettability.

[Inkjet Recording Method]

The inkjet recording method according to the invention and an inkjet recording apparatus applicable to the inkjet recording method are described below.

The inkjet recording method according to the invention includes:

a process of applying the ink composition onto a recording medium using an inkjet recording apparatus; and a process of irradiating the applied ink composition with an active energy radiation, to cure the ink composition.

In the inkjet recording method according to the invention including the above processes, an image formed by the cured ink composition is formed on the recording medium.

In the process of ejecting the ink composition using an inkjet recording apparatus in the inkjet recording method according to the invention, the inkjet recording apparatus described in detail below can be used.

The inkjet recording apparatus used in the inkjet recording method according to the invention is not particularly limited, and may be freely selected from known inkjet recording apparatuses capable of achieving a desired resolution. In other words, known inkjet recording apparatuses, including commercially products, are all applicable to the ejection of the ink composition onto a recording medium in the inkjet recording method according to the invention.

An exemplary inkjet recording apparatus that can be used in the invention is an apparatus including an ink supply system, a temperature sensor and a heating device.

The ink supply system may include, for example, a primary tank that holds the ink composition according to the invention, a supply pipe, an ink supply tank directly upstream the inkjet head, a filter and a piezoelectric inkjet head. The piezoelectric inkjet head may be driven to eject ink droplets for forming multi-size dots of from 1 to 100 pl, and preferably from 8 to 30 pl, at a resolution of, for example, from 320×320 dpi to 4,000×4,000 dpi, preferably from 400×400 dpi to 1,600×1,600 dpi, and more preferably from 720×720 dpi. As used herein, "dpi" refers to the number of dots per 2.54 cm.

When ejected, the ink composition according to the invention is preferably maintained at a constant temperature. Therefore, the inkjet recording apparatus preferably includes a device that stabilizes the temperature of the ink composition. The region in which the ink composition is maintained at a constant temperature may be all of the piping system and members from the ink tank (or an intermediate tank if the inkjet recording apparatus includes the intermediate tank) to the nozzle ejection face. In other words, the region ranging from the ink supply tank to the inkjet head may be thermally insulated and heated.

The method for the temperature control is not particularly limited. For example, it is preferable that plural temperature sensors are provided at respective pipe portions, and that control of heating is carried out in accordance with the flow rate of the ink and the environmental temperature. The temperature sensors may be provided at the ink supply tank and at or around a nozzle of the inkjet head. The head unit to be heated is preferably thermally shielded or thermally insulated, so as to prevent the head unit device from being affected by the temperature of the atmosphere. It is preferable that the head unit is thermally insulated from other portions of the inkjet recording apparatus, and that the entire heat capacity of the heating unit is reduced, in order to shorten the printer start-up time required for heating, and to decrease the loss of thermal energy.

In a case in which the above inkjet recording apparatus is used to eject the ink composition, the ink composition is ejected preferably after the viscosity of the ink composition is decreased to be in the range of from 5 to 30 mPa·s, more preferably in the range of from 7 to 25 mPa·s, by heating the ink composition to a temperature of from 25° C. to 60° C., more preferably from 25° C. to 50° C. In particular, in a case in which the ink composition according to the invention has a viscosity at 25° C. of from 35 mPa·s to 500 mPa·s, the ink composition can exert a great effect. According to this method, high ejection stability can be realized.

The ink composition according to the invention generally has a higher viscosity than aqueous inks that are used as inks for usual inkjet recording. Therefore, a fluctuation of the viscosity of the ink composition according to the invention due to a fluctuation of the temperature of the ink composition at ejection is large. The fluctuation of the ink viscosity exerts a great influence on a change of the liquid droplet size and the liquid droplet ejection speed, thereby causing deterioration of image quality. Thus, it is preferable that the temperature of the ink composition at the time of ejection be maintained as constant as possible. Therefore, it is suitable that the ink temperature in the invention is controlled to be in the range of from (set temperature −5° C.) to (set temperature +5° C.), more preferably in the range of from (set temperature −2° C.) to (set temperature +2° C.), and still more preferably in the range of from (set temperature −1° C.) to (set temperature +1° C.).

Next, the process of irradiating the ejected ink composition with an active energy radiation so as to cure the ink composition is described.

The ink composition ejected onto a recording medium is cured by irradiation with an active energy radiation. The curing occurs according to the following mechanism. The radical polymerization initiator contained in the ink composition according to the invention is decomposed by the irradiation of an active energy radiation to generate an initiating species such as a radical, and a polymerization reaction of the specific heterocyclic compound and an optionally-used other polymerizable compound is initiated and promoted due to the function of the initiating species. Here, in a case in which a sensitizing dye is present together with the radical polymerization initiator in the ink composition, the sensitizing dye in this system absorbs the active energy radiation and gets into an excited state; when the excited sensitizing dye contacts the radical polymerization initiator, the sensitizing dye promotes decomposition of the radical polymerization initiator, as a result of which a curing reaction with higher sensitivity can be achieved.

The polymerization initiating system employed in the ink composition according to the invention has sufficient sensitivity to even a low-output active energy radiation. Therefore, the output of the active energy radiation is preferably 2,000 mJ/cm² or less, more preferably from 10 to 2,000 mJ/cm², still more preferably from 20 to 1,000 mJ/cm², and particularly preferably from 50 to 800 mJ/cm².

It is suitable that the active energy radiation is irradiated such that the irradiance on the face to be exposed to the active energy radiation is, for example, from 10 to 2,000 mW/cm², and preferably from 20 to 1,000 mW/cm².

As active energy radiation sources, mercury lamps, gas lasers, solid state lasers and the like are mainly used, and mercury lamps and metal halide lamps are widely known as light sources used for curing active energy radiation-curable ink compositions. However, elimination of use of mercury is currently strongly desired from the viewpoint of environmental protection. Replacement with GaN semiconductor ultraviolet emission devices is industrially and environmentally very useful. It is expected that LEDs (such as UV-LEDs) and LDs (such as UV-LDs) become to be used as useful light sources for photo-curing type inkjet since they are compact, and have long life, high efficiency and low cost.

Light-emitting diodes (LEDs) and laser diodes (LDs) can be used as active energy radiation sources. In a case in which a UV light source is required, a UV LED or a UV LD can be used. An example of such a UV light source is a violet-color LED of which the main emission spectrum ranges from 365 nm to 420 nm, and which is commercially available from Nichia CORPORATION. In a case in which a still shorter wavelength is required, a LED disclosed in U.S. Pat. No. 6,084,250, which can emit an active energy radiation centered in the range of from 300 nm to 370 nm, can be used. Other UV LEDs are also available, and can emit radiations in respectively different UV bands. In the invention, the active energy radiation source is preferably a UV-LED, and particularly preferably a UV-LED having a peak wavelength in the range of from 350 to 420 nm.

The LED has a maximum irradiance on the recording medium of preferably from 10 to 2,000 mW/cm², more preferably from 20 to 1,000 mW/cm², and particularly preferably from 50 to 800 mW/cm².

It is suitable that the ink composition according to the invention is irradiated with such an active energy radiation for from 0.01 to 120 seconds, more preferably from 0.1 to 90 seconds.

The irradiation conditions and basic irradiation methods of the active energy radiation are disclosed in JP-A No. 60-132767. Specifically, the irradiation with an active energy radiation may be carried out by scan-moving a head unit and light sources in a so-called shuttle manner, wherein the head unit includes an ink ejection device, and the light sources are respectively provided at both sides of the head unit. The irradiation with an active energy radiation may be carried out when a certain time (for example, from 0.01 seconds to 0.5 seconds, more preferably from 0.01 seconds to 0.3 seconds, and still more preferably from 0.01 seconds to 0.15 seconds) has passed after ink spotting. Setting the time that elapses from ink spotting to the irradiation to be extremely short as described above enables the ink spotted on the recording medium to be prevented from bleeding before curing. Further, even when a porous recording medium is used, the ink composition can be irradiated before the ink composition penetrates deep into the recording medium at which a radiation from a radiation source cannot reach; therefore, the amount of residual unreacted monomers can be reduced, as a result of which odor can be suppressed.

The ink composition may be cured using a light source which is provided separately from a head unit, and which is not driven to move. WO99/54415 pamphlet discloses an irradiation method in which an optical fiber is used, or an irradiation method in which UV light from a collimated light source is reflected on a mirror face provided on a side face of a head unit, so as to irradiate a recording region with the UV light. These curing methods are also applicable to the inkjet recording method according to the invention.

When the inkjet recording method described above is adopted, the dot diameter of the spotted ink can be maintained constant even in a case in which various recording media exhibiting respectively different surface wettability are used. Therefore, image quality can be improved by adopting the inkjet recording method. In a case in which a color image is to be formed, it is preferable that ink images are superposed one on another in the order of increasing brightness. When inks are superposed one on another in the order of increasing brightness, the radiation used for irradiation more easily reaches an ink at the lower region, which is expected to provide favorable curing sensitivity, reduction in the amount of residual monomers, suppression of odor and improvement of adhesiveness. The irradiation may be carried out all at once after the ejection of all colors. However, it is more preferable to carry out the irradiation every time the ejection of each color ink has been conducted, from the viewpoint of promotion of curing.

As described above, using the ink composition according to the invention, an image having high definition and high strength can be formed on a surface of a recording medium, through high-sensitivity curing of the ink composition by irradiation with an active energy radiation. An image exhibiting excellent adhesiveness to the recording medium can be formed using the ink composition according to the invention.

Further, when the ink composition according to the invention is applied to an inkjet apparatus, stable image formation can be carried out. This is because the ink composition according to the invention does not cause deposition of components thereof at or around an inkjet head or other similar troubles, and has excellent ejection properties.

Moreover, as described above, the ink composition according to the invention cures at high sensitivity by irradiation with an active energy radiation, and an ink image formed therefrom is flexible and has excellent adhesiveness to a recording medium. Therefore, the ink composition according to the invention can be applied to a wide range of applications.

<Recording Medium>

The recording medium in the invention is not particularly limited, and recording media that are known as supports or recording materials can be used. Examples of the recording medium include paper, paper on which a plastic (such as polyethylene, polypropylene or polystyrene) is laminated, a metal plate (such as of aluminum, zinc or copper), a plastic film (such as of cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal or polyvinyl chloride), paper on which any of the above metals is laminated or deposited, and a plastic film on which any of the above metals is laminated or deposited. Non-absorbent recording media can be suitably used as recording media in the invention.

In JP-A No. 2008-507598 and JP-A No. 2004-285304, no study is made on the solvent resistance (resistance against organic solvent) of an image recorded by an inkjet method. Further, the storage stability of the inks of JP-A No. 2008-507598 and JP-A No. 2004-285304 are not at a perfect level.

JP-A No. 2008-507598 also fails to study the resistance against blocking. JP-A No. 2009-108171 fails to make a study on improving the adhesiveness of a recorded image to the substrate. Further, the ejection properties of ink compositions in the case of forming images using the ink compositions of JP-A No. 2008-507598 and JP-A No. 2009-108171 are not at a perfect level.

In view of the above, the first embodiment of the invention provides an ink composition for inkjet recording which has excellent storage stability, and from which an image recorded by an inkjet method and having excellent solvent resistance can be obtained.

The second embodiment of the invention provides an ink composition suitable for inkjet recording which exhibits high curing sensitivity to irradiation with an active energy radiation and excellent ejection properties when an image is recorded by an inkjet method, and from which a recorded image having excellent adhesiveness to a recording medium and excellent anti-blocking properties can be obtained.

Hereinafter, the first and second embodiments of the invention are described with reference to specific aspects thereof.

Aspects of the first embodiment include the following.

<1> An ink composition for inkjet recording, including:

(Component A) a urethane oligomer or polymer that has at least one group selected from the group consisting of groups represented by following Formulae (1) to (3) at one or more side chains of the oligomer or polymer; and (Component B) an organic solvent,

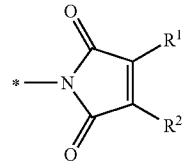

Formula (1)

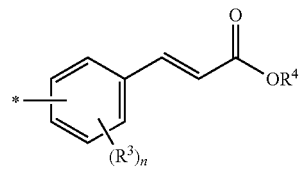

Formula (2)

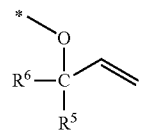

Formula (3)

wherein, in Formula (1), $R^1$ and $R^2$ each independently represent a hydrogen atom or an alkyl group, and $R^1$ and $R^2$ may be bonded to each other to form a ring; and wherein, in Formula (2), each $R^3$ independently represents a hydrogen atom, an alkyl group, an alkoxy group, an aryloxy group, an alkoxycarbonyl group, an aryloxycarbonyl group or a halogen atom; $R^3$s may be bonded to each other to form a ring; $R^4$ represents a hydrogen atom, an alkyl group or an aryl group; and n represents an integer from 0 to 4; and wherein, in Formula (3), $R^5$ and $R^6$ each independently represent a hydrogen atom, an alkyl group or an aryl group, and $R^5$ and $R^6$ may be bonded to each other to form a ring; and wherein, in Formulae (1) to (3), * represents a bonding position.

<2> The ink composition for inkjet recording according to <1>, wherein the (Component A) urethane oligomer or polymer has a group represented by Formula (1).

<3> The ink composition for inkjet recording according to <1>, wherein the (Component A) urethane oligomer or polymer has at least one repeating unit selected from the group consisting of repeating units represented by following Formula (11), (12) and (13):

Formula (11)

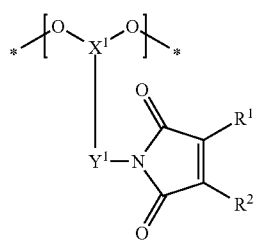

Formula (12)

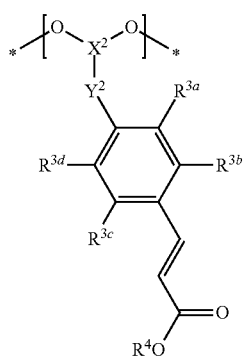

Formula (13)

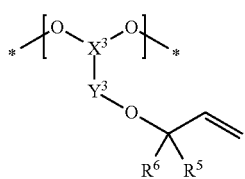

wherein, in Formula (11), $R^1$ and $R^2$ each independently represent a hydrogen atom or an alkyl group, and $R^1$ and $R^2$ may be bonded to each other to form a ring; and wherein, in Formula (12), $R^{3a}$, $R^{3b}$, $R^{3c}$ and $R^{3d}$ each independently represent a hydrogen atom, an alkyl group, an alkoxy group, an aryloxy group, an alkoxycarbonyl group, an aryloxycarbonyl group or a halogen atom; $R^{3a}$, $R^{3b}$, $R^{3c}$ or $R^{3d}$ may be bonded to another of $R^{3a}$, $R^{3b}$, $R^{3c}$ or $R^{3d}$ to form a ring; and $R^4$ represents a hydrogen atom, an alkyl group or an aryl group; and wherein, in Formula (13), $R^5$ and $R^6$ each independently represent a hydrogen atom, an alkyl group or an aryl group, and $R^5$ and $R^6$ may be bonded to each other to form a ring, and wherein, in Formulae (11) to (13), $X^1$, $X^2$ and $X^3$ each independently represent a residue obtained by removing three hydrogen atoms from at least one compound selected from the group consisting of an alkane having from 3 to 10 carbon atoms and a cycloalkane having from 3 to 10 carbon atoms; and $Y^1$, $Y^2$ and $Y^3$ each independently represent a single bond or an alkylene group.

<4> The ink composition for inkjet recording according to any one of <1> to <3>, wherein the (Component B) organic solvent is a non-polymerizable organic solvent.

<5> The ink composition for inkjet recording according to <4>, wherein the (Component B) organic solvent includes at least one organic solvent selected from the group consisting of following Formulae (I) and (II):

Formula (I)

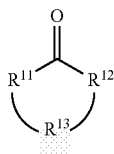

wherein, in Formula (1), $R^{11}$ and $R^{12}$ each independently represent $—CH_2—$, $—NR^{14}—$ or $—O—$, provided that $R^{11}$ and $R^{12}$ are not both simultaneously $—CH_2—$; $R^{14}$ represents an alkyl group having from 1 to 3 carbon atoms, a hydroxyalkyl group having from 1 to 3 carbon atoms, a hydroxyl group or a hydrogen atom; $R^{13}$ represents a hydrocarbon group represented by $—C_mH_{2m}—$, $—C_mH_{2m-2}—$ or $—C_mH_{2m-4}—$; and m represents an integer from 2 to 8;

Formula (II)

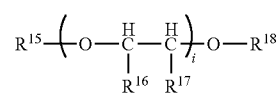

wherein, in Formula (II), $R^{15}$, $R^{16}$, $R^{17}$ and $R^{18}$ each independently represent a hydrogen atom, a methyl group, an ethyl group or an acetyl group; and i represents an integer from 1 to 3.

<6> The ink composition for inkjet recording according to any one of <1> to <5>, wherein a total content of the (Component B) organic solvent is from 50% by mass to 90% by mass relative to the entire amount of the ink composition.

<7> The ink composition for inkjet recording according to any one of <1> to <6>, wherein the (Component A) urethane oligomer or polymer includes a repeating unit represented by following Formula (21):

Formula (21)

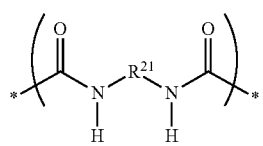

wherein, in Formula (21), $R^{21}$ represents at least one type of group selected from the group consisting of an alkylene group, a cycloalkylene group, an arylene group and a combination thereof.

<8> The ink composition for inkjet recording according to <7>, wherein $R^{21}$ in the repeating unit represented by Formula (21) is a cycloalkylene group, a combination of at least one cycloalkylene group and at least one alkylene group, or a combination of at least one cycloalkylene group and at least one arylene group.

<9> The ink composition for inkjet recording according to any one of <1> to <8>, wherein the weight average molecular weight of the (Component A) urethane oligomer or polymer is from 1,000 to 20,000.

<10> The ink composition for inkjet recording according to any one of <1> to <9>, wherein the content of the (Component A) urethane oligomer or polymer is from 6 to 40% by mass relative to the entire amount of the ink composition.

<11> The ink composition for inkjet recording according to any one of <1> to <10>, further including:

(Component C) a colorant.

<12> An inkjet recording method including:
applying the ink composition of any one of <1> to <11> onto a recording medium, using an inkjet recording apparatus;
irradiating the applied ink composition with active energy radiation; and
drying by heating the applied ink composition.

<13> An inkjet printed article obtained by recording by the inkjet recording method of <12>.

Aspects of the second embodiment of the invention include the following.

<1> An ink composition including:
a polymerizable compound;
a polymerization initiator; and
a urethane oligomer or polymer having a structure represented by following Formula (A) at a side chain:

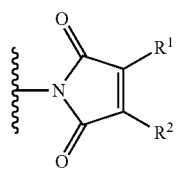

(A)

wherein, in Formula (A), $R^1$ and $R^2$ each independently represent a hydrogen atom or an alkyl group, and $R^1$ and $R^2$ may be bonded to each other to form a ring.

<2> The ink composition according to <1>, wherein the urethane oligomer or polymer includes a repeating unit represented by following Formula (B):

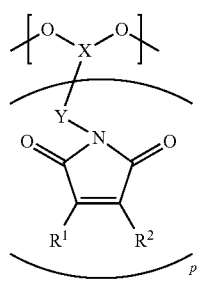

(B)

wherein, in Formula (B), $R^1$ and $R^2$ each independently represent a hydrogen atom or an alkyl group, and $R^1$ and $R^2$ may be bonded to each other to form a ring; p represents an integer from 1 to 3; X represents a linking group having a valency of 2+p; and Y represents a single bond or a divalent linking group.

<3> The ink composition according to <1> or <2>, wherein $R^1$ and $R^2$ are hydrogen atoms.

<4> The ink composition according to any one of <1> to <3>, wherein the weight average molecular weight of the urethane oligomer or polymer is from 1,000 to 10,000.

<5> The ink composition according to any one of <1> to <4>, wherein the content of the urethane oligomer or polymer is from 0.5 to 5% by mass relative to the entire amount of the ink composition.

<6> The ink composition according to any one of <1> to <5>, wherein the urethane oligomer or polymer includes a repeating unit represented by following Formula (C):

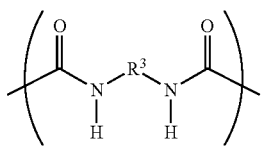

(C)

wherein, in Formula (C), $R^3$ represents at least one type of group selected from the group consisting of an alkylene group, a cycloalkylene group, an arylene group and a combination thereof.

<7> The ink composition according to <6>, wherein the group represented by $R^3$ includes a cycloalkylene group.

<8> The ink composition according to any one of <1> to <7>, wherein the polymerizable compound is a radical-polymerizable compound.

<9> The ink composition according to any one of <1> to <8>, wherein the content of water is 1% by mass or less relative to the entire amount of the ink composition.

<10> The ink composition according to any one of <1> to <9>, wherein the total content of the polymerizable compound and the urethane oligomer or polymer is 60% by mass or more relative to the entire amount of the ink composition.

<11> The ink composition according to any one of <1> to <10>, further including a pigment.

<12> The ink composition according to any one of <1> to <11>, wherein the ink composition is an ink composition for inkjet recording.

<13> An inkjet recording method including:
applying the ink composition of any one of <1> to <12> onto a recording medium, using an inkjet recording apparatus; and
irradiating the applied ink composition with active energy radiation, to cure the ink composition.

EXAMPLES

In the following, the first and second embodiments of the invention are more specifically explained with reference to examples. However, the invention is not limited to the embodiments depicted by the examples. Further, in the following explanation, "part(s)" always refers to "part(s) by mass" unless otherwise indicated.

From among the compounds used in Examples and Comparative Examples, compounds of which the manufacturers are not indicated were synthesized according to known methods or applied methods thereof.

Examples pertaining to the first embodiment of the invention are illustrated below.

[Preparation of Pigment Dispersion A (Mill Base)]

30 parts by mass of NOVOPERM YELLLOW H2G (C.I. Pigment Yellow 120, tradename, manufactured by Clariant), 30 parts by mass of DISPERBYK-168 (pigment dispersant having a solids content of 30%, tradename, manufactured by BYK Chemie), and 40 parts by mass of RAPICURE DVE-3 (triethyleneglycol divinyl ether, tradename, manufactured by ISP TECHNOLOGIES INC.) were mixed, and agitated at 3,000 rpm for 10 minutes using a mixer (L4R, tradename, manufactured by Silverson Machines). Thereafter, the mixture was charged in a bead mill disperser DISPERMAT SL (tradename, manufactured by VMA-GETZMANN GmbH), and dispersed at 2,500 rpm for 6 hours using zirconia beads having a diameter of 0.65 mm (YTZ ball, tradename, manufactured by NIKKATO CORPORATION) at a bead filling ratio of 80 vol %, as a result of which a yellow mill base (pigment dispersion A) was obtained.

(Ink Composition 1)

The following components were agitated at 2,500 rpm for 15 minutes using a mixer, as a result of which a yellow-colored ink composition 1 for use in Example 1 was prepared.
  pigment dispersion A: 15.0 parts
  propylene carbonate (4-methyl-2-oxo-1,3-dioxolane, (Component B) organic solvent, manufactured by Nippon Soda Co., Ltd.): 29.0 parts
  diethyleneglycol diethyl ether ((Component B) organic solvent, manufactured by TOHO Chemical Industry Co., Ltd.): 40.0 parts
  isopropyl thioxanthone (sensitizing dye): 1.0 parts
  urethane compound (U-1) ((Component A) urethane compound, having a weight average molecular weight of 5,200 and the following structure): 15.0 parts Ink compositions of Examples 2 to 10 and Comparative Examples 1 and 2 having the compositions shown in Table 1 were prepared using the pigment dispersion A obtained above, in a manner similar to the preparation method of the ink composition 1. The ink composition of Comparative Example 1 was prepared using a polymer binder instead of the urethane compound. Therefore, the ink composition of Comparative Example 1 is an ink composition free of urethane compound. The numbers representing blending amounts in Table 1 are expressed in terms of parts by mass.

The ingredients of the ink composition used in the Examples and Comparative Examples are shown below.

<Component (A) Urethane Compound>

Urethane compounds (U-2) to (U-9) and a comparative urethane compound (U-10) used in the ink compositions shown in Table 1 have the structures shown below. The weight average molecular weights thereof are as indicated in Table 1. Regarding the synthesis method, each urethane compound was synthesized by synthesizing a diol having a group represented by Formula (1) based on the method described in *Tetrahedron*, vol. 58, page 7049 (2002), and allowing the diol to react with an diisocyanate component to perform urethanization.

| Urethane Compound | Isocyanate Component (a) | Alcohol Component (b) | Alcohol Component (c) |
|---|---|---|---|
| (U-1) | [structure] | [structure] | [structure] |

| | Urethane Compound | (a:b:c) | Weight Average Molecular Weight |
|---|---|---|---|
| | (U-1) | (50:30:20) | 5200 |

| Urethane Compound | Isocyanate Component (a) | Alcohol Component (b) | Alcohol Component (c) | (a:b:c) | Weight Average Molecular Weight |
|---|---|---|---|---|---|
| (U-2) | 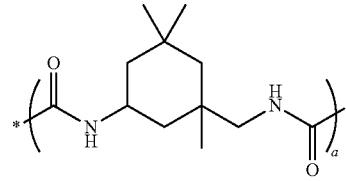 | 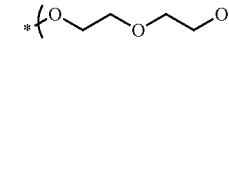 | 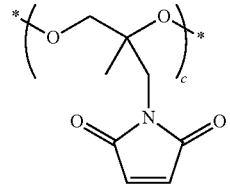 | (50:30:20) | 5500 |
| (U-3) | 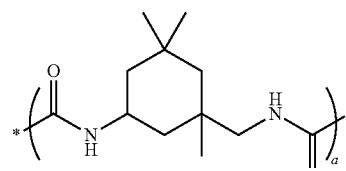 | 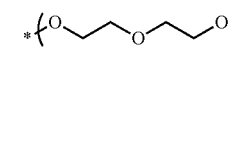 | 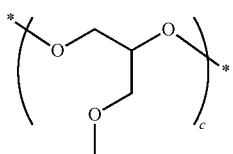 | (50:30:20) | 5500 |
| (U-4) | 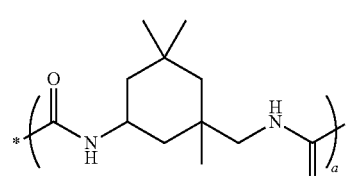 | 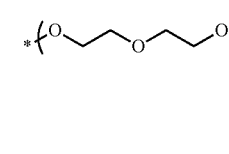 | 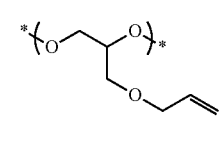 | (50:30:20) | 5300 |
| (U-5) | 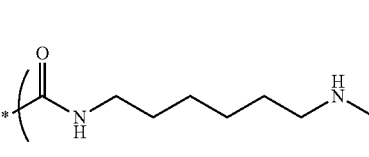 | 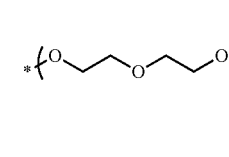 | 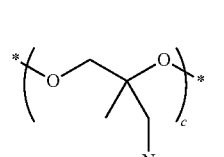 | (50:30:20) | 5500 |
| (U-6) | 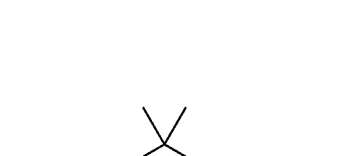 | Not Contained | 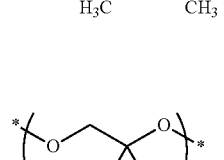 | (50:0:50) | 5300 |

| Urethane Compound | Isocyanate Component (a) | Isocyanate Component (a') | Alcohol Component (b) |
|---|---|---|---|
| (U-7) | *—(NH–CH2–CH(CH2-maleimide)–CH2–NH–C(=O))a—* | *—(C(=O)–NH–(isophorone)–CH2–NH–C(=O))a'—* | *—(O–CH2CH2–O–CH2CH2–O)b—* |

| Urethane Compound | Alcohol Component (c) | (a:a':b:c) | Weight Average Molecular Weight |
|---|---|---|---|
| (U-7) | *—(O–CH2–cyclohexyl–CH2–O)c—* | (20:30:30:20) | 5500 |

| Urethane Compound | Isocyanate Component (a) | Alcohol Component (b) | Alcohol Component (c) | (a:b:c) | Number Average Molecular Weight |
|---|---|---|---|---|---|
| (U-8) | *—(C(=O)–NH–(isophorone)–CH2–NH–C(=O))a—* | *—(O–CH2CH2–O–CH2CH2–O)b—* | *—(O–CH2–C(CH3)(CH2-dimethylmaleimide)–CH2–O)c—* | (50:30:20) | 17400 |
| (U-9) | *—(C(=O)–NH–(isophorone)–CH2–NH–C(=O))a—* | *—(O–CH2CH2–O–CH2CH2–O)b—* | *—(O–CH2–C(CH3)(CH2-dimethylmaleimide)–CH2–O)c—* | (50:30:20) | 800 |

| Comparative Urethane Compound | Isocyanate Component (a) | Alcohol Component (b) | (a:b) | Weight Average Molecular Weight |
|---|---|---|---|---|
| (U-10) | *—(C(=O)–NH–(isophorone)–CH2–NH–C(=O))a—* | *—(O–CH2CH2–O–CH2CH2–O)b—* | (50:50) | 5400 |

<(Component B) Organic Solvent>
propylene carbonate (4-methyl-2-oxo-1,3-dioxolane, organic solvent, manufactured by Nippon Soda Co., Ltd.)
diethyleneglycol diethyl ether (organic solvent, manufactured by TOHO Chemical Industry Co., Ltd.)
<Sensitizing Dye>
isopropyl thioxanthone (product name: 2-isopropylthioxanthone, manufactured by Tokyo Chemical Industry Co., Ltd.)
<Polymer Binder>
ELVACITE 2013 (methyl methacrylate-butyl methacrylate copolymer, tradename, manufactured by Du pont Kabushiki Kaisha)
(Evaluation of Ink Composition)
<Adhesiveness>

The ink composition was applied onto a surface of a 220 μm-thick polyvinyl chloride sheet as a recording medium to give a wet film thickness of 12 μm, using a K hand coater (bar No. 2). Next, the recording medium was heated at 60° C. for three minutes in a dry oven so as to dry the solvent. Then, the recording medium was allowed to repeatedly pass through a UV conveyor apparatus CSOT (manufactured by GS Yuasa International Ltd.) equipped with an ozoneless metal halide lamp MAN125L (tradename) and set at a conveyor speed of 6 m/minute and an irradiation intensity of 1,800 W/cm$^2$, until adhesiveness of the coating surface disappeared, as a result of which the ink composition was cured by the active energy radiation.

The adhesiveness to the recording medium was evaluated according to a cross hatch test (EN ISO2409), and expressed by ranks 5B to 1B according to the ASTM method. Rank 5B indicates the highest adhesiveness, and ranks 3B, 4B and 5B indicate practically nonproblematic level.

The results are shown in Table 1.
<Ejection Stability>

JETLYZER (tradename, manufactured by Mimaki Engineering Co., Ltd.) equipped with an inkjet print head CA3 (tradename, manufactured by TOSHIBA TEC CORPORATION) was set at an ejection voltage of 22V and ejection droplet number of 7 drops, and the ink composition was continuously ejected at 45° C. for 60 minutes, and evaluation was carried out according to the following criteria. The results are shown in Table 1. In addition, "dot loss" as used herein refers to a phenomenon whereby a dot fails to be printed, and a dot loss ratio reflects the ratio of defective ejection.

A: dot loss was not observed at all
B: dot loss occurred at a ratio of from 0 to 2% of the entire print
C: dot loss occurred at a ratio of from 2 to 5% of the entire print
D: dot loss occurred at a ratio of from 5 to 20% of the entire print
E: dot loss occurred at a ratio of 20% or more of the entire print.

<Evaluation of Resistance Against Solvent>

Image formation was carried out by a method similar to the image formation method used in the evaluation of adhesiveness, and a solid image having an average film thickness of 12 μm was obtained. Then, the surface of the printed article was rubbed with a cotton swab impregnated with isopropyl alcohol, and evaluated according to the following criteria. The results are shown in Table 1.

A: change in the image was not observed even after the image was rubbed for 10 times or more
B: the density of the image was decreased by rubbing for 5 to 9 times
C: the density of the image was decreased by rubbing for 2 to 4 times
D: the image density was remarkably decreased by rubbing only once <Evaluation of Storage Stability of Ink Composition>

The ink composition obtained was placed in a container, the container was hermetically sealed, and allowed to stand at 60° C. for 1 week. Then, the separation of the ink composition was observed, and evaluated according to the following criteria. The results are shown in Table 1.

A: no change was observed in the ink composition
B: the ink composition slightly separated, but could be used without problem after gentle shaking
C: the ink composition completely separated.

As shown in the Table below, the ink composition according to the invention has excellent storage stability and excellent solvent resistance. It is also shown that the ink composition according to the invention also exerts excellent effects with respect to adhesiveness and ejection stability.

TABLE 1

| | | Weight Average Molecular Weight | Example 1 | Example 2 | Example 3 | Example 4 | Example 5 | Example 6 | Example 7 |
|---|---|---|---|---|---|---|---|---|---|
| Urethane Compound | (U-1) | 5200 | (U-1):15 | 0 | 0 | 0 | 0 | 0 | 0 |
| | (U-2) | 5500 | 0 | (U-2):15 | 0 | 0 | 0 | 0 | 0 |
| | (U-3) | 5500 | 0 | 0 | (U-3):15 | 0 | 0 | 0 | 0 |
| | (U-4) | 5300 | 0 | 0 | 0 | (U-4):15 | 0 | 0 | 0 |
| | (U-5) | 5500 | 0 | 0 | 0 | 0 | (U-5):15 | 0 | 0 |
| | (U-8) | 17400 | 0 | 0 | 0 | 0 | 0 | (U-8):15 | 0 |
| | (U-9) | 800 | 0 | 0 | 0 | 0 | 0 | 0 | (U-9):15 |
| | (U-6) | 5300 | 0 | 0 | 0 | 0 | 0 | 0 | 0 |
| | (U-7) | 5500 | 0 | 0 | 0 | 0 | 0 | 0 | 0 |
| | (U-10); Comparative Urethane Compound | 5400 | 0 | 0 | 0 | 0 | 0 | 0 | 0 |
| Polymer Binder | ELVACITE 2013 | | 0 | 0 | 0 | 0 | 0 | 0 | 0 |
| Solvent | Propylene Carbonate | | 29 | 29 | 29 | 29 | 29 | 29 | 29 |
| | Diethyleneglycol diethyl ether | | 40 | 40 | 40 | 40 | 40 | 40 | 40 |
| Pigment Dispersion | A | | 15 | 15 | 15 | 15 | 15 | 15 | 15 |

TABLE 1-continued

| Sensitizing Dye Effects | | | | | | | | |
|---|---|---|---|---|---|---|---|---|
| | Isopropyl thioxanthone | 1 | 1 | 1 | 1 | 1 | 1 | 1 |
| | Storage Stability | A | A | A | A | A | B | A |
| | Solvent Resistance | A | B | B | B | B | A | C |
| | Adhesiveness | 5B | 4B | 4B | 4B | 4B | 3B | 5B |
| | Ejection Stability | A | A | A | A | A | A | A |

| | | Weight Average Molecular Weight | Example 8 | Example 9 | Example 10 | Comparative Example 1 | Comparative Example 2 |
|---|---|---|---|---|---|---|---|
| Urethane Compound | (U-1) | 5200 | 0 | 0 | (U-1):10 | 0 | 0 |
| | (U-2) | 5500 | 0 | 0 | 0 | 0 | 0 |
| | (U-3) | 5500 | 0 | 0 | 0 | 0 | 0 |
| | (U-4) | 5300 | 0 | 0 | 0 | 0 | 0 |
| | (U-5) | 5500 | 0 | 0 | 0 | 0 | 0 |
| | (U-8) | 17400 | 0 | 0 | 0 | 0 | 0 |
| | (U-9) | 800 | 0 | 0 | 0 | 0 | 0 |
| | (U-6) | 5300 | (U-6):15 | 0 | 0 | 0 | 0 |
| | (U-7) | 5500 | 0 | (U-7):15 | 0 | 0 | 0 |
| | (U-10); Comparative Urethane Compound | 5400 | 0 | 0 | 0 | 0 | (U-10):15 |
| Polymer Binder | ELVACITE 2013 | | 0 | 0 | 0 | 15 | 0 |
| Solvent | Propylene Carbonate | | 29 | 29 | 34 | 29 | 29 |
| | Diethyleneglycol diethyl ether | | 40 | 40 | 45 | 40 | 40 |
| Pigment Dispersion | A | | 15 | 15 | 10 | 15 | 15 |
| Sensitizing Dye Effects | Isopropyl thioxanthone | | 1 | 1 | 1 | 1 | 1 |
| | Storage Stability | | A | A | A | C | C |
| | Solvent Resistance | | B | A | C | D | D |
| | Adhesiveness | | 5B | 5B | 4B | 2B | 3B |
| | Ejection Stability | | B | A | A | C | C |

According to the first aspect of the invention, an ink composition for inkjet recording which has excellent storage stability, and from which an image recorded by an inkjet method and having excellent resistance against solvent can be obtained, can be provided.

In the following, examples pertaining to the second embodiment of the invention are illustrated.

[Preparation of Pigment Dispersion (Mill Base)]

30 parts by mass of NOVOPERM YELLLOW H2G (C.I.Pigment Yellow 120, tradename, manufactured by Clariant), 30 parts by mass of DISPERBYK-168 (pigment dispersant having a solids content of 30%, tradename, manufactured by BYK Chemie), and 40 parts by mass of RAPICURE DVE-3 (triethyleneglycol divinyl ether, tradename, manufactured by ISP TECHNOLOGIES INC.) were mixed, and agitated at 3,000 rpm for 10 minutes using a mixer (L4R, tradename, manufactured by Silverson Machines). Thereafter, the mixture was charged in a bead mill disperser DISPERMAT SL (tradename, manufactured by VMA-GETZMANN GmbH), and dispersed at 2,500 rpm for 6 hours using zirconia beads having a diameter of 0.65 mm (YTZ ball, tradename, manufactured by NIKKATO CORPORATION) at a bead filling ratio of 80 vol %, as a result of which a yellow mill base (mill base 1) was obtained.

<Ink Composition A>

The following components were agitated at 2,500 rpm for 15 minutes using a mixer (L4R, tradename, manufactured by Silverson Machines), as a result of which a yellow-colored ink composition A for use in Example 11 was prepared.

the mill base 1 obtained above: 13.0 parts

N-vinyl-ε-caprolactam (polymerizable compound, NVC, manufactured by BASF Japan Ltd.): 14.5 parts phenoxyethyl acrylate (polymerizable compound, manufactured by SARTOMER): 37.7 parts isobornyl acrylate (polymerizable compound, manufactured by Wako Pure Chemical Industries, Ltd.): 15.0 parts dipropyleneglycol diacrylate SR508 (polymerizable compound, dipropyleneglycol diacrylate, manufactured by SARTOMER): 4.3 parts p-methoxyphenol (polymerization terminator, manufactured by Wako Pure Chemical Industries, Ltd.): 1.0 parts LUCIRIN TPO (polymerization initiator, manufactured by BASF Japan Ltd.): 9.5 parts IRGACURE 184 (polymerization initiator, manufactured by BASF Japan Ltd., 1-hydroxycyclohexyl phenyl ketone): 3.0 parts urethane compound (Ur-1) (urethane compound having a structure represented by Formula (A) at a side chain, and having a weight average molecular weight of 3,000; the structure of the urethane compound is shown below): 2.0 parts The chemical structure of urethane compound (Ur-1) is shown below.

| Compound | Isocyanate Component (x) | Alcohol Component (y) | Alcohol Component (z) | x:y:z | Weight Average Molecular Weight |
|---|---|---|---|---|---|
| (Ur-1) | 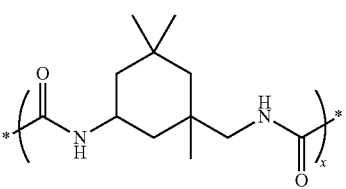 | 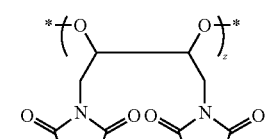 | 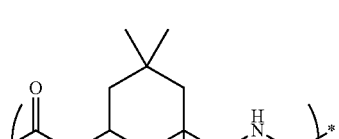 | 50:30:20 | 3,000 |

(Synthesis of Urethane Compound (Ur-1))

Compound C-1 was obtained based on the description of *Tetrahedron* vol. 58, page 7049 (2002). 60 mg of NEO-STANN U-600 (bismuth-based catalyst, tradename, manufactured by Nitto Kasei Co., Ltd.) was added to a solution of 67.7 g (0.305 mol) of isophorone diisocyanate (manufactured by Wako Pure Chemical Industries, Ltd.), 24.3 g (0.122 mol) of compound C-1 and 19.4 g (0.183 mol) of diethyleneglycol (manufactured by Wako Pure Chemical Industries, Ltd.) in 290 mL of methyl ethyl ketone. The resultant mixture solution was agitated at 60° C. for 6 hours, and 10 g of methanol was added thereto, and the resultant solution was again mixed at 60° C. for 2 hours. The reaction liquid obtained was diluted with 500 mL of acetone, and added into hexane while agitating, so that a solid was reprecipitated. The solid was rinced with methanol, and then dried at room temperature, as a result of which 84.6 g of urethane compound (Ur-1) in the form of a white solid was obtained. The molecular weight of urethane compound (Ur-1) as measured by a GPC (GPC HLC-8220GPC manufactured by TOSOH CORPORATION) was 3,000 in terms of weight average molecular weight. The structure of compound C-1 is shown below.

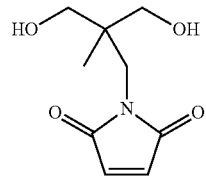

C-1

<Ink Compositions B to J>

Ink compositions B to G to be used in Examples 12 to 17 and ink compositions H to J to be used in Comparative Examples 3 to 5 were prepared in the same manner as the preparation of ink composition A, except that the types and addition amounts of pigment dispersion, polymerizable compound and urethane compound were changed as shown in Table 2.

Urethane compounds (Ur-2) to (Ur-5), (A-1) and (A-2) used in the ink compositions shown in Table 2 have the following structures and weight average molecular weights.

| Compound | Isocyanate Component (x) | Alcohol Component (y) | Alcohol Component (z) | x:y:z | Weight Average Molecular Weight |
|---|---|---|---|---|---|
| (Ur-2) | | | | 50:30:20 | 3,300 |
| (Ur-3) | | | | 50:30:20 | 3,200 |

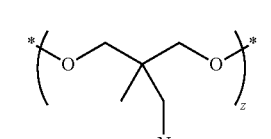

-continued

| Compound | Isocyanate Component (x) | Alcohol Component (y) | Alcohol Component (z) | x:y:z | Weight Average Molecular Weight |
|---|---|---|---|---|---|
| (Ur-4) | 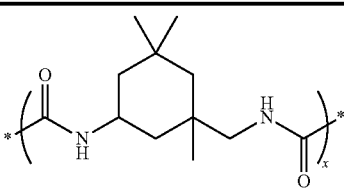 | 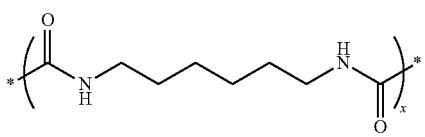 | 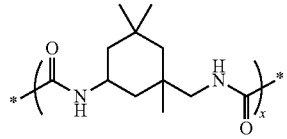 | 50:30:20 | 12,000 |
| (Ur-5) | 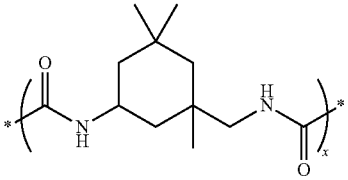 | | | 50:30:20 | 2,800 |

| Compound | Isocyanate Component (x) | Alcohol Component (y) | Alcohol Component (z') | x:y:z' | Weight Average Molecular Weight |
|---|---|---|---|---|---|
| (A-1) | | | | 50:30:20 | 3,000 |

Alcohol component (z') is an alcohol component used in place of alcohol component (z).

| Compound | Isocyanate Component (x) | Alcohol Component (y) | Alcohol Component (z) | x:y:z | Weight Average Molecular Weight |
|---|---|---|---|---|---|
| (A-2) | | | — | 50:50:0 | 3,000 |

Urethane compounds (Ur-2) to (Ur-5), (A-1) and (A-2) can be prepared in a manner similar to the preparation of urethane compound (Ur-1), using corresponding raw materials.

[Evaluation of Ink Composition]

<Adhesiveness>

The ink composition was applied onto a surface of a 220 μm-thick polyvinyl chloride sheet as a recording medium to give a wet film thickness of 12 μm, using a K hand coater (bar No. 2). Then, the recording medium was allowed to repeatedly pass through a UV conveyor apparatus CSOT (manufactured by GS Yuasa International Ltd.) equipped with an ozoneless metal halide lamp MAN 125L (tradename) and set at a conveyor speed of 6 m/minute and an irradiation intensity of 1,800 W/cm², until adhesiveness of the coating surface disappeared, as a result of which the ink composition was cured by the active energy radiation.

The adhesiveness to the recording medium was evaluated according to a cross hatch test (EN ISO2409), and expressed by ranks 5B to 1B according to the ASTM method. Rank 5B indicates the highest adhesiveness, and ranks 3B, 4B and 5B indicate practically nonproblematic level.

The results are shown in Table 2.

<Tack-Free Sensitivity (Curing Sensitivity)>

An image was formed on a sheet of the recording medium in the same manner as the image formation method described in the evaluation of adhesiveness. The curing sensitivity was evaluated according to the following criteria. The results are shown in Table 2. Here, the expression "become tack-free" means that the ink coating on the surface of the recording medium ceases to be tacky.

—Criteria—

5: the ink coating became tack-free after passing the UV conveyor apparatus once, which indicates a very high curing speed 4: the ink coating became tack-free after passing the UV conveyor apparatus twice or three times, which indicates a high curing speed 3: the ink coating became tack-free after passing the UV conveyor apparatus four or five times, which indicates a slightly low curing speed 2: the ink coating became tack-free after passing the UV conveyor apparatus six to nine times, which indicates a low curing speed 1: the ink coating did not become tack-free even after passing the UV conveyor apparatus ten times, which indicates a very low curing speed <Anti-Blocking Properties>

An image was formed on a sheet of the recording medium in the same manner as the image formation method described in the evaluation of adhesiveness. On the coated face of the sheet, another sheet of the recording medium that had not been coated with the ink composition was superposed, a uniform weight of 25 g/cm² was applied to the entire sheet, and the stacked sheets were allowed to stand at 25° C. for 24 hours. In order to evaluate blocking, the sheet that had not been coated with the ink composition was peeled from the coated sheet, and the extent of transfer of the ink composition to the uncoated sheet was evaluated according to the following criteria. The results are shown in Table 2.

—Criteria—

5: transfer to the uncoated sheet was not observed, which indicates excellent anti-blocking properties 4: slight transfer to the uncoated sheet was observed (less than 10% of the coated area)

3: transfer to the uncoated sheet was observed (from 10% to less than 30% of the coated area)

2: remarkable transfer to the uncoated sheet was observed (from 30% to less than 50% of the coated area)

1: remarkable transfer to the uncoated sheet was observed (50% or more of the coated area)

<Ejection Properties>

JETLYZER (tradename, manufactured by Mimaki Engineering Co., Ltd.) equipped with an inkjet print head CA3 (tradename, manufactured by TOSHIBA TEC CORPORATION) was set at an ejection voltage of 22V and ejection droplet number of 7 drops, and the ink composition was continuously ejected at 45° C. for 60 minutes, and evaluation was carried out according to the following criteria. The results are shown in Table 2.

—Criteria—

5: unprinted portion is not observed at all

4: less than 2% of the entire print was unprinted

3: from 2% to less than 5% of the entire print was unprinted

2: from 5% to less than 20% of the entire print was unprinted

1: 20% or more of the entire print was unprinted.

In Examples 11 to 17 according to the invention, excellent effects were obtained with respect to all of the adhesiveness, the curing sensitivity, the blocking sensitivity and the ejection properties.

TABLE 2

| | | Example 11 Ink Composition A | Example 12 Ink Composition B | Example 13 Ink Composition C | Example 14 Ink Composition D | Example 15 Ink Composition E |
|---|---|---|---|---|---|---|
| Mill Base | Mill base 1 | 13 | 13 | 13 | 13 | 13 |
| Polymerizable Compound | N-vinyl-ε-caprolactam | 14.5 | 14.5 | 14.5 | 14.5 | 14.5 |
| | Phenoxyethyl acrylate | 37.7 | 37.7 | 37.7 | 37.7 | 39.3 |
| | Isobornyl acrylate | 15 | 15 | 15 | 15 | 15 |
| | Dipropyleneglycol diacrylate | 4.3 | 4.3 | 4.3 | 4.3 | 4.3 |
| Polymerization Terminator | p-methoxyphenol | 1 | 1 | 1 | 1 | 1 |
| Polymerization Initiator | LUCIRIN TPO | 9.5 | 9.5 | 9.5 | 9.5 | 9.5 |
| | IRGACURE184 | 3 | 3 | 3 | 3 | 3 |
| Urethane Compound | (Ur-1) | 2 | — | — | — | 0.4 |
| | (Ur-2) | — | 2 | — | — | — |
| | (Ur-3) | — | — | 2 | — | — |
| | (Ur-4) | — | — | — | 2 | — |
| | (Ur-5) | — | — | — | — | — |
| | (A-1) | — | — | — | — | — |
| | (A-2) | — | — | — | — | — |
| Evaluation | Adhesiveness | 5B | 5B | 5B | 5B | 3B |
| | Tack-free sensitivity (Curing Sensitivity) | 5 | 5 | 5 | 5 | 5 |
| | Blocking Sensitivity | 5 | 5 | 4 | 5 | 5 |
| | Ejection Properties | 5 | 5 | 4 | 3 | 5 |

| | | Example 16 Ink Composition F | Example 17 Ink Composition G | Comparative Example 3 Ink Composition H | Comparative Example 4 Ink Composition I | Comparative Example 5 Ink Composition J |
|---|---|---|---|---|---|---|
| Mill Base | Mill base 1 | 13 | 13 | 13 | 13 | 13 |
| Polymerizable Compound | N-vinyl-ε-caprolactam | 14.5 | 14.5 | 14.5 | 14.5 | 14.5 |

TABLE 2-continued

|  |  |  |  |  |  |  |
|---|---|---|---|---|---|---|
|  | Phenoxyethyl acrylate | 33.7 | 37.7 | 39.7 | 37.7 | 37.7 |
|  | Isobornyl acrylate | 15 | 15 | 15 | 15 | 15 |
|  | Dipropyleneglycol diacrylate | 4.3 | 4.3 | 4.3 | 4.3 | 4.3 |
| Polymerization Terminator | p-methoxyphenol | 1 | 1 | 1 | 1 | 1 |
| Polymerization Initiator | LUCIRIN TPO | 9.5 | 9.5 | 9.5 | 9.5 | 9.5 |
|  | IRGACURE184 | 3 | 3 | 3 | 3 | 3 |
| Urethane | (Ur-1) | 6 | — | — | — | — |
| Compound | (Ur-2) | — | — | — | — | — |
|  | (Ur-3) | — | — | — | — | — |
|  | (Ur-4) | — | — | — | — | — |
|  | (Ur-5) | — | 2 | — | — | — |
|  | (A-1) | — | — | — | 2 | — |
|  | (A-2) | — | — | — | — | 2 |
| Evaluation | Adhesiveness | 5B | 5B | 1B | 2B | 3B |
|  | Tack-free sensitivity (Curing Sensitivity) | 5 | 4 | 2 | 3 | 3 |
|  | Blocking Sensitivity | 5 | 4 | 2 | 4 | 3 |
|  | Ejection Properties | 3 | 5 | 5 | 4 | 2 |

*Numbers in Table 2 represent parts by mass
*"—" indicates that the ingredient is not contained.

According to the second embodiment of the invention, an ink composition suitable for inkjet recording which has high curing sensitivity to irradiation with an active energy radiation and excellent ejection properties when an image is recorded by an inkjet method, and from which a recorded image having excellent adhesiveness to a recording medium and excellent anti-blocking properties can be obtained, and an inkjet recording method using the ink composition according to the invention, are provided.

What is claimed is:

1. An ink composition for inkjet recording, comprising:
   as Component A, a urethane oligomer or polymer that has at least one repeating unit selected from the group consisting of Formula (11), Formula (12) and Formula (13):

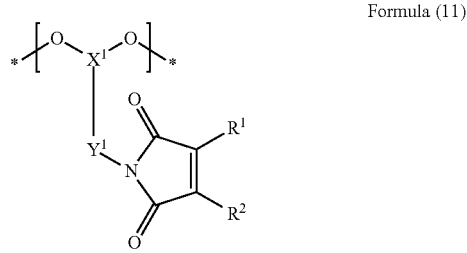

Formula (11)

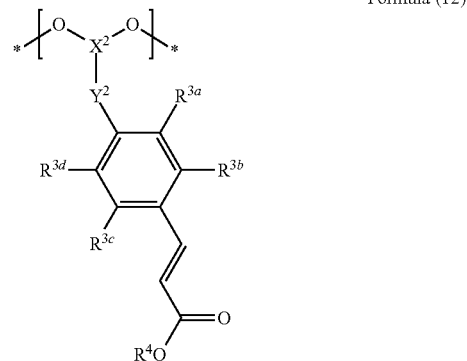

Formula (12)

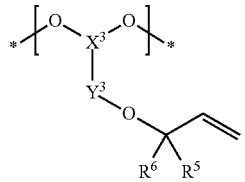

Formula (13)

wherein:
in Formula (11), $R^1$ and $R^2$ each independently represents a hydrogen atom or an alkyl group, and $R^1$ and $R^2$ optionally bond to each other to form a ring,
in Formula (12), $R^{3a}$, $R^{3b}$, $R^{3c}$ and $R^{3d}$ each independently represents a hydrogen atom, an alkyl group, an alkoxy group, an aryloxy group, an alkoxycarbonyl group, an aryloxycarbonyl group or a halogen atom; $R^{3a}$, $R^{3b}$, $R^{3c}$ or $R^{3d}$ optionally bond to another of $R^{3a}$, $R^{3b}$, $R^{3c}$ or $R^{4d}$ to form a ring; and $R^4$ represents a hydrogen atom, an alkyl group or an aryl group,
in Formula (13), $R^5$ and $R^6$ each independently represents a hydrogen atom, an alkyl group or an aryl group, and $R^5$ and $R^6$ optionally bond to each other to form a ring, and
in Formulae (11) to (13), $X^1$, $X^2$ and $X^3$ each independently represents a residue obtained by removing three hydrogen atoms from at least one compound selected from the group consisting of an alkane having from 3 to 10 carbon atoms and a cycloalkane having from 3 to 10 carbon atoms; $Y^1$ represents an alkylene group having 1 to 20 carbon atoms; and $Y^2$ and $Y^3$ each independently represents a single bond or an alkylene group; and
as Component B, an organic solvent.

2. The ink composition for inkjet recording according to claim 1, wherein $R^1$ and $R^2$ each represents a methyl group.

3. The ink composition for inkjet recording according to claim 1, wherein the total content of the Component B organic solvent is from 50% by mass to 90% by mass relative to the entire amount of the ink composition.

4. The ink composition for inkjet recording according to claim 1, wherein the weight average molecular weight of the Component A urethane oligomer or polymer is from 1,000 to 20,000.

5. The ink composition for inkjet recording according to claim 1, wherein the content of the Component A urethane oligomer or polymer is from 6 to 40% by mass relative to the entire amount of the ink composition.

6. The ink composition for inkjet recording according to claim 1, further comprising as Component C a colorant.

7. The ink composition for inkjet recording according to claim 1, wherein the Component B organic solvent is a non-polymerizable organic solvent.

8. The ink composition for inkjet recording according to claim 7, wherein the Component B organic solvent comprises at least one organic solvent selected from the group consisting of Formula (I) and Formula (II):

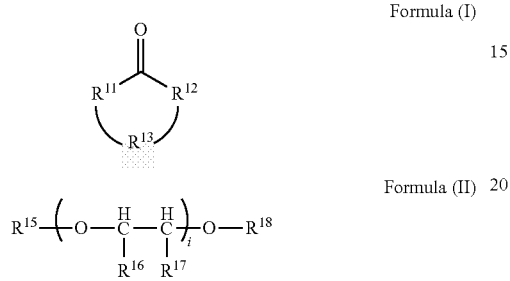

Formula (I)

Formula (II)

wherein, in Formula (1), $R^{11}$ and $R^{12}$ each independently represents $-CH_2-$, $-NR^{14}-$ or $-O-$, provided that $R^{11}$ and $R^{12}$ are not both simultaneously $-CH_2-$; $R^{14}$ represents an alkyl group having from 1 to 3 carbon atoms, a hydroxyalkyl group having from 1 to 3 carbon atoms, a hydroxyl group or a hydrogen atom; $R^{13}$ represents a hydrocarbon group represented by $-C_mH_{2m}-$, $-C_mH_{2m-2}-$ or $-C_mH_{2m-4}-$; and m represents an integer from 2 to 8; and wherein, in Formula (II), $R^{15}$, $R^{16}$, $R^{17}$ and $R^{18}$ each independently represents a hydrogen atom, a methyl group, an ethyl group or an acetyl group; and i represents an integer from 1 to 3.

9. The ink composition for inkjet recording according to claim 1, wherein the Component A urethane oligomer or polymer comprises a repeating unit represented by Formula (21):

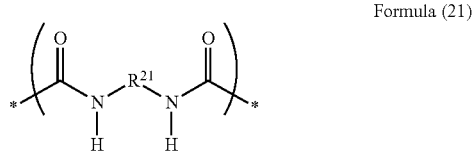

Formula (21)

wherein, in Formula (21), $R^{21}$ represents at least one type of group selected from the group consisting of an alkylene group, a cycloalkylene group, an arylene group and a combination thereof.

10. The ink composition for inkjet recording according to claim 9, wherein $R^{21}$ in the repeating unit represented by Formula (21) is a cycloalkylene group, a combination of at least one cycloalkylene group and at least one alkylene group, or a combination of at least one cycloalkylene group and at least one arylene group.

11. An inkjet recording method comprising:
applying the ink composition of claim 1 onto a recording medium, using an inkjet recording apparatus;
irradiating the applied ink composition with active energy radiation; and
drying by heating the applied ink composition.

12. An inkjet printed article obtained by recording by the inkjet recording method of claim 11.

13. An ink composition comprising:
a polymerizable compound;
a polymerization initiator; and
a urethane oligomer or polymer comprising a repeating unit represented by Formula (B):

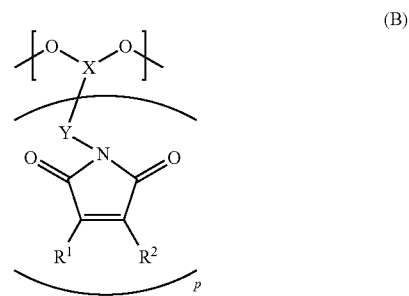

(B)

wherein, in Formula (B), $R^1$ and $R^2$ each independently represents a hydrogen atom or an alkyl group, and $R^1$ and $R^2$ optionally bond to each other to form a ring; p represents an integer from 1 to 3; X represents a linking group having a valency of 2+p; and Y represents an alkylene group having 1 to 5 carbon atoms.

14. The ink composition according to claim 13, wherein $R^1$ and $R^2$ are hydrogen atoms.

15. The ink composition according to claim 13, wherein the weight average molecular weight of the urethane oligomer or polymer is from 1,000 to 10,000.

16. The ink composition according to claim 13, wherein the content of the urethane oligomer or polymer is from 0.5 to 5% by mass relative to the entire amount of the ink composition.

17. The ink composition according to claim 13, wherein the polymerizable compound is a radical-polymerizable compound.

18. The ink composition according to claim 13, wherein the content of water is 1% by mass or less relative to the entire amount of the ink composition.

19. The ink composition according to claim 13, wherein the total content of the polymerizable compound and the urethane oligomer or polymer is 60% by mass or more relative to the entire amount of the ink composition.

20. The ink composition according to claim 13, further comprising a pigment.

21. The ink composition according to claim 13, wherein the ink composition is an ink composition for inkjet recording.

22. The ink composition according to claim 13, wherein the urethane oligomer or polymer comprises a repeating unit represented by Formula (C):

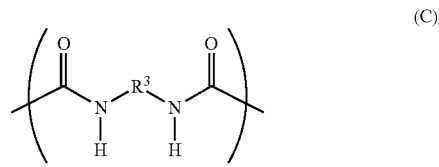

(C)

wherein, in Formula (C), $R^3$ represents at least one group selected from the group consisting of an alkylene group, a cycloalkylene group, an arylene group and a combination thereof.

23. The ink composition according to claim 22, wherein the group represented by $R^3$ comprises a cycloalkylene group.

24. An inkjet recording method comprising:
applying the ink composition of claim 13 onto a recording medium, using an inkjet recording apparatus; and
irradiating the applied ink composition with active energy radiation, to cure the ink composition.

* * * * *